(12) United States Patent
Beinhocker

(10) Patent No.: US 7,619,226 B2
(45) Date of Patent: Nov. 17, 2009

(54) INTEGRATED OPTICAL NEUTRON DETECTOR

(75) Inventor: Gilbert D. Beinhocker, Belmont, MA (US)

(73) Assignee: Tamper Proof Container Licensing Corp., Belmont, MA (US)

( * ) Notice: Subject to any disclaimer, the term of this patent is extended or adjusted under 35 U.S.C. 154(b) by 14 days.

(21) Appl. No.: 12/070,194

(22) Filed: Feb. 15, 2008

(65) Prior Publication Data

US 2008/0237485 A1 Oct. 2, 2008

Related U.S. Application Data

(60) Provisional application No. 60/920,904, filed on Mar. 30, 2007.

(51) Int. Cl.
*G01T 1/00* (2006.01)

(52) U.S. Cl. .................................. 250/474.1

(58) Field of Classification Search ............. 250/390.01
See application file for complete search history.

(56) References Cited

U.S. PATENT DOCUMENTS

| | | | |
|---|---|---|---|
| 2,311,613 | A | 2/1943 | Slayter |
| 3,320,114 | A | 5/1967 | Schulz |
| 3,634,845 | A | 1/1972 | Colman |
| 3,714,644 | A | 1/1973 | Hellstrom |
| 3,947,837 | A | 3/1976 | Bitterice |

(Continued)

FOREIGN PATENT DOCUMENTS

DE 485 035 10/1929

(Continued)

OTHER PUBLICATIONS

Bonner, Robert C., "Remarks of U.S. Customs Commissioner Robert C. Bonner: U.S. Customs and Border Protection C-TPAT Conferenence San Francisco, California Oct. 30, 2003," http://www.cpb.gov/xp/cgov/newsroom/commissioner/ speeches_statements/ Oct30,2003.xml (8 pages).

(Continued)

*Primary Examiner*—David P Porta
*Assistant Examiner*—Marcus H Taningco
(74) *Attorney, Agent, or Firm*—Weingarten, Schurgin, Gagnebin & Lebovici LLP

(57) ABSTRACT

A system and method for detecting radiation from a source in a container is disclosed. A continuous optical fiber path is disposed in a medium which is part of or associated with a container and which totally encapsulates the inside volumetric space of the container. The optical fiber path provides a volumetric mass of optical fiber which is reactive to radiation from a radiation source in the container to cause an irreversible change in the light carrying capacity or other characteristic of the optical fiber. A light source is coupled to one end of the optical fiber path for introducing light having a predetermined characteristic. A light detector is coupled to the other end of the optical path for receiving light from the optical path. A circuit is coupled to the light detector and is operative to detect a change in the predetermined characteristic of the light and to provide an indication thereof in a fail-safe manner. The extraction of a radiation signal from background radiation noise is achieved using geometric methodologies. The detection system is operative to facilitate the detection of low level flux of thermalized neutrons.

110 Claims, 5 Drawing Sheets

U.S. PATENT DOCUMENTS

| | | | |
|---|---|---|---|
| 4,095,872 | A | 6/1978 | Stieff et al. |
| 4,118,211 | A | 10/1978 | Au Coin et al. |
| 4,161,348 | A | 7/1979 | Ulrich |
| 4,175,827 | A | 11/1979 | McMahon |
| 4,195,907 | A | 4/1980 | Zamja et al. |
| 4,217,488 | A | 8/1980 | Hubbard |
| 4,228,425 | A | 10/1980 | Cooke |
| 4,234,875 | A | 11/1980 | Williams |
| 4,297,684 | A | 10/1981 | Butter |
| 4,367,460 | A | 1/1983 | Hodara |
| 4,447,123 | A | 5/1984 | Page et al. |
| 4,488,269 | A | 12/1984 | Robinson et al. |
| 4,538,527 | A | 9/1985 | Kitchen |
| 4,573,202 | A | 2/1986 | Lee |
| 4,603,252 | A | 7/1986 | Malek et al. |
| 4,772,092 | A | 9/1988 | Hofer et al. |
| 4,788,436 | A * | 11/1988 | Koechner ............... 250/485.1 |
| 4,801,213 | A | 1/1989 | Frey et al. |
| 4,867,820 | A | 9/1989 | Jacobson et al. |
| 4,908,510 | A | 3/1990 | Huggins et al. |
| 4,931,771 | A | 6/1990 | Kahn |
| 4,935,723 | A | 6/1990 | Vallance |
| 4,972,176 | A | 11/1990 | Vallance |
| 5,049,855 | A | 9/1991 | Slemon et al. |
| 5,081,363 | A | 1/1992 | Tetzlaff et al. |
| 5,180,060 | A | 1/1993 | Forti et al. |
| 5,194,847 | A | 3/1993 | Taylor et al. |
| 5,309,533 | A | 5/1994 | Bonniau et al. |
| 5,313,065 | A * | 5/1994 | Reed ......................... 250/368 |
| 5,323,011 | A | 6/1994 | Suter et al. |
| 5,355,208 | A | 10/1994 | Crawford et al. |
| 5,359,416 | A | 10/1994 | Mueller |
| 5,568,124 | A | 10/1996 | Joyce et al. |
| 5,592,149 | A | 1/1997 | Alizi |
| 5,609,952 | A | 3/1997 | Weiss |
| 5,769,232 | A | 6/1998 | Cash et al. |
| 5,790,025 | A | 8/1998 | Amer et al. |
| 6,002,501 | A | 12/1999 | Smith et al. |
| 6,065,870 | A | 5/2000 | Nunez |
| 6,213,167 | B1 | 4/2001 | Greenland |
| 6,556,138 | B1 | 4/2003 | Silva et al. |
| 6,879,257 | B2 | 4/2005 | Hisano |
| 6,891,470 | B2 | 5/2005 | Bohinc, Jr. |
| 6,919,803 | B2 | 7/2005 | Breed |
| 7,098,444 | B2 | 8/2006 | Beinhocker |
| 7,211,783 | B2 | 5/2007 | Beinhocker |
| 7,352,284 | B2 | 4/2008 | Krill |
| 2002/0089434 | A1 | 7/2002 | Ghazarian |
| 2003/0151509 | A1 | 8/2003 | Iannotti et al. |
| 2003/0174059 | A1 | 9/2003 | Reeves |
| 2003/0193032 | A1 | 10/2003 | Marshall |
| 2004/0037091 | A1 | 2/2004 | Guy |
| 2004/0046660 | A1 | 3/2004 | Ando |
| 2004/0047142 | A1 | 3/2004 | Goslee |
| 2004/0056767 | A1 | 3/2004 | Porter |
| 2005/0151068 | A1 * | 7/2005 | Beinhocker ............ 250/227.15 |
| 2007/0001844 | A1 | 1/2007 | Krill |

FOREIGN PATENT DOCUMENTS

| | | |
|---|---|---|
| GB | 13359 | 1/1914 |
| WO | WO 93/11513 | 6/1993 |
| WO | WO 93/23648 | 11/1993 |
| WO | WO 98/26388 | 6/1998 |

OTHER PUBLICATIONS

Kimura et al., "New Techniques to Apply Optical Fiber Image Guide to Nuclear Facilities," J. Nuc. Sci. and Tech., vol. 39, No. 6, pp. 603-607 (Jun. 2002).

Lu et al., "Gamma-induced attenuation in normal single-mode and multimode, Ge-doped and P-doped optical fibers: A fiber optic dosimeter for low dose levels," Published on the NRC Research Press Web site on May 11, 2000, Can. J. Phys. vol. 78, pp. 89-97.

Nucsafe Inc., Introduction "Fiber Sensing Technology—The Long and Short of It," http://nucsafe.com/Puma/introduction.htm May 21, 2004, p. 1 of 1.

Nucsafe Inc., "Why Neutrons," http://nucsafe.com/Puma/why_neutrons.htm, May 21, 2004, p. 1 of 1.

Nucsafe Inc., "Guardian CRMS," http://nucsafe.com/Puma/guardian_crms.htm, pgs. May 21, 2004, 6 pages.

Nucsafe Inc., "Fiber Facility," http://nucsafe.com/Puma/fiber_facilities.htm, May 21, 2004, 2 pages.

Nucsafe Inc., "Detecting Neutrons," http://nucsafe.com/Puma/detecting_neutrons.htm, May 21, 2004, 3 pages.

Nucsafe Inc., "Photonics," http://nucsafe.com/Puma/pr_photonicsspectra.htm, Jul. 9, 2004, 2 pages.

Nucsafe Inc., "Tech Transfer," http://nucsafe.com/Puma/pr_techtransfer.htm, Jul. 9, 2004, 2 pages.

Nucsafe Inc., "Press Release—First Applauds Job Creation at Oak Ridge Based-Nucsafe," http://nucsafe.com/Puma/pr_knoxnews.htm, Jul. 9, 2004, 3 pages.

Nucsafe Inc., "Optical Properties," http://nucsafe.com/Puma/properties_of_scintillating_fibe.htm, Jan. 12, 2005, p. 1 of 1.

Ott, Melanie N., "Radiation Effects Data on Commercially Available Optical Fiber: Database Summary," Nuclear Science and Radiation Effects Conference, Phoenix, Arizona, NSREC 2002, Data Workshop Proceedings, July, 8 pages (we believe this to be accurate).

Ott, Melanie N., "Radiation Effects Expected for Fiber Laser/Amplifier Rare Earth Doped Optical Fiber," NASA Survey Report (Mar. 26, 2004), 7 pages.

Giallorenzi et al. Optical fiber sensor technology, IEEE Journal of Quantum Electronics, vol. QE-18, No. 4 (Apr. 1982), pp. 626-665.

\* cited by examiner

INTEGRATED OPTICAL NEUTRON DETECTOR

CROSS REFERENCE TO RELATED APPLICATIONS

This application claims priority under 35 U.S.C. §119(e) of U.S. Provisional Patent Application No. 60/920,904 filed Mar. 30, 2007, the disclosure of which is hereby incorporated by reference herein.

This application is related to the present inventor's U.S. Pat. No. 7,211,783 issued May 1, 2007, and U.S. application Ser. No. 11/444,160 filed May 31, 2006, the disclosures of which are hereby incorporated by reference herein.

STATEMENT REGARDING FEDERALLY SPONSORED RESEARCH OR DEVELOPMENT

N/A

BACKGROUND OF THE INVENTION

The present invention relates to security systems for shipping containers, boxes, cartons and the like and, more particularly, to such security systems that can detect tampering with, or breaches in, surfaces of such containers or nuclear radiation from materials placed in the containers.

Cargo is often shipped in standardized containers, such as those used on trucks, trains, ships and aircraft. Smaller units of cargo are typically shipped in cardboard boxes and the like. It is often difficult or impossible to adequately guard these containers and boxes while they are in transit, such as on the high seas. In addition, some shipments originate in countries where port or rail yard security may not be adequate. Consequently, these containers and boxes are subject to tampering by thieves, smugglers, terrorists, and other unscrupulous people. A breached container can, for example, be looted or surreptitiously loaded with contraband, such as illegal drugs, weapons, explosives, contaminants or a weapon of mass destruction, such as a nuclear weapon or a radiological weapon, with catastrophic results. Alternatively, a nuclear or radiological weapon can be loaded by a rogue state or terrorist organization into such a container for shipment without necessarily breaching the container.

Such breaches and weapons are difficult to detect. The sheer number of containers and boxes being shipped every day makes it difficult to adequately inspect each one. Even a visual inspection of the exterior of a container is unlikely to reveal a breach. Shipping containers are subject to rough handling by cranes and other heavy equipment. Many of them have been damaged multiple times in the natural course of business and subsequently patched to extend their useful lives. Thus, upon inspection, a surreptitiously breached and patched container is likely to appear unremarkable. Furthermore, many security professionals would prefer to detect breached containers and radioactive cargoes prior to the containers entering a port and possibly preventing such containers from ever entering the port. The current method of placing a seal across the locking mechanism of a container door is of limited value, whether there is a physical breach of the container or not, because the nuclear or radiological weapon could be loaded by terrorist as legitimate cargo. For example, the terrorists could circumvent or corrupt inventory controls and cargo manifest delivery systems using unscrupulous confederates. A single breach or circumvention of a cargo delivery system by whatever means can have catastrophic consequences.

There is a need for systems that can detect the secreting of illicit radioactive materials, nuclear bombs, and radiological weapons into shipping containers and other enclosures. This is a matter of great concern to the national security of many countries. In particular because of the rapid advance in methodologies, since 1945, to make different kinds of nuclear weapons, it is now possible that terrorists or rogue nations could make less than perfect weapons that nations with high standard of technological achievement have obtained. Specifically, because a plutonium weapon threat may also be materialized on a non-sophisticated basis, covering a spectrum of barely functioning weapons, such as the North Korean "fizzle bomb test" or the use of reactor grade plutonium, it is apparent that even unsophisticated weapons in enemy hands can create a crude but effective nuclear threat. The prognosis long term for nuclear terrorism is even more alarming. The ability to create a rudimentary fission bomb with as little energy release as ⅓ kiloton, has the capacity to trigger a hydrogen bomb. Hence, the need for a detection system that has the ability to detect and analyze a wide variety of constituent isotopes that may be used to make a less than perfect weapons grade plutonium bomb which could be used to trigger a hydrogen bomb.

The inspection of huge numbers of shipping containers with expensive fixed and portable multifunctional radiation detection systems is not reliable, practical, nor even capable of detection of low level radiation emissions, such as emitted by plutonium or highly enriched uranium. These current detection systems are not capable of inspecting large numbers of containers from either a necessary "detection time of measurement" or manpower perspective, let alone meeting government objectives of inspecting 100% of all containers entering the country. The current number of containers inspected is only approximately 4% with a significant number of false positive alarms. There is a need for a practical solution to automating a 100% inspection process and ensuring that once a container is sealed at the start of its transit, it arrives at its destination in the same sealed condition, while simultaneously during its transit being continuously monitored for any secreted presence of illicit radioactive material.

The problem confronting persons responsible for taking measurements for detecting the presence of radioactive materials, such as customs officers is extremely challenging. In addition to practical time limits of taking radiation measurements because of the requirement not to unduly impede the economic flow of containerized goods, there is the lack of a readily identifiable solid angle of emission from a secreted weapon buried somewhere within the container under inspection for the presence of a radiation source. Because the emitted radiation from a weapon such as a plutonium or uranium bomb is very low, as these elements have long half-lives, are essentially self-shielding, and may be encased in a protective lead shield, passive detection of such emitted radiation is very difficult. The conventional approach of random wanding of suspected containers by portable hand instruments in an attempt to indicate a possible radiation source is not effective especially because of material background radiation and radiation from legitimate sources which have attendant low level radiation emissions. The key to using current detection techniques whether in fixed portal systems or hand held portable instruments is the necessity to employ very sophisticated mathematical processing algorithms to detect a weak weapon radiation signal out of natural background radiation or certain types of legitimate cargo materials which emit radiation. This is an attempt to compensate for a lack of adequate time of measurement. Alternate inspection regimes, such as active scanning with gamma rays or x-rays have proved ineffective for a variety of reasons, and are considered by many skilled in the art of security matters to be downright dangerous. A terrorist could easily configure a crystal radiation detection circuit as a booby trap trigger to detonate a nuclear or radiological weapon in a port as soon as it receives an active scan by a gamma ray or x-ray machine. According to many studies, such as by the GAO (Homeland Security Committee, House of Representatives—Mar. 14, 2007), on the efficacy of these techniques, they are not capable of performing to the designated detection performance goals of the federal government. Compounding the problem of insufficient measurement time for detecting weak radiation signals buried in background radiation is a lack of knowledge beforehand exactly where the solid angle of emission lies.

It is known that optical fibers used for communication systems and the like can be sensitive to radiation in terms of adversely affecting the qualitative and quantitative transmission of light in the optical fiber. Such fibers are usually designed or selected to minimize the sensitivity of the fiber to impinging radiation, a process called "hardening". Such fibers are also often designed or selected to recover from radiation induced darkening so that the fibers can remain useable for the intended purpose of transmitting light signals. Radiation dosimeters are also known for detecting nuclear radiation and such dosimeters are usually recyclable and reusable by recovering from the affects of received radiation.

BRIEF SUMMARY OF THE INVENTION

Embodiments of the present invention can detect a physical breach of the interior surface of a shipping container or box or radiation from a radioactive source within or near the container or box, and can then trigger an alarm or notify a central monitoring location, such as a ship's control room or a port notification system. At least one liner sheet lines at least a portion of at least one interior surface of the shipping container or box, such that a physical breach of the portion of the interior surface also damages the liner sheet, or radiation from a radioactive source, such as a nuclear or radiological weapon, impinges on the liner sheet. It is a well known physics phenomenon that radiation will directly affect the atomic and molecular structures of crystals forming the glass or silica in optical fibers by creating irregularities in crystalline structure called "color centers". The liner sheet defines an optical path extending across at least a portion of the sheet. The optical path is monitored for a change in electromagnetic radiation intensity, such as a loss or reduction of continuity of light transmission signal, or other optical characteristic of the optical path, or a change in a characteristic of the light signal, such as a frequency or phase shift. If the container or box interior surface is breached or the optical path is irradiated, one or more portions of the optical path are affected and the optical path is broken or altered.

For example, a breach of the container or box can break the optical path by cutting the core of the optical fiber which is typically 10 to 100 microns in diameter. The destruction of the core, causes an instantaneous and complete loss of light transmission. Thus the optical fiber acts as a true binary switch, it is either on or off, light conducting or non-conducting. This "binary switch" is in effect passing a single binary bit of information around the single continuous light path i.e., light signal is present or it is not present. The system is in effect "an optical fuse", and analogous to an electrical fuse i.e., conducting of non-conducting. Alternatively, radiation can reduce or alter the light transmissibility of the optical path. The detected change in the optical path can be used to trigger an alarm, such as an annunciator or cause an electronic notification signal to be sent to a monitoring station via any of a wide variety of existing telecommunications networks, such as the Internet and/or a wireless telecommunications network. In addition, a detailed accompanying message can provide information about the nature of the breach, time, location, cargo manifest, etc.

In one aspect of the invention used to detect radiation, an optical fiber is employed which irreversibly responds to received radiation such that the fiber cannot self anneal or otherwise recover its light transmission characteristics after being subject to radiation. Thus the system employing such a fiber provides a true single onetime use continuous monitoring system. The system can be likened to an electrical fuse which when blown in the presence of excessive electrical current cannot be reused or recover from the over current condition. According to the present invention disruption in the transmission of a light beam in the single continuous optical circuit provided by the optical fiber causes an alarm signal which can, for example, be sent to a designated monitoring station in response to radiation darkening of the optical fiber circuit.

Radiation of various types, such as gamma, x-ray, beta, alpha and neutron particles can reduce, alter, or interrupt the transmission of many types of light that may be used to produce a light signal transmission in an optical fiber path. In order to enhance the detection of incident radiation within a cargo container on the optical fiber path inside of the container, the light introduced into the optical fiber can have a predetermined characteristic which is detectable at the receiving end of the fiber. In one embodiment a coded sequence of light pulses is transmitted along the optical fiber path, and change in the pulses or data derived from the pulses over time can be detected as an indication of radiation incident on the fiber. Alternatively, light pulses can provide binary bit patterns which are transmitted through the optical fiber and a detected predetermined error rate employed as an indication of radiation detection caused by a specific radioactive material. The error rate can increase as the optical transmissibility of the fiber decreases due to exposure to radiation which causes a darkening (attenuation) of the optical fiber. This increase in error rate can provide an indication of detected radiation both as to decay time (half-life) and quantity of radioactive material present. A mathematical profile of the error rate over time can be correlated to known decay profiles of various nuclear isotopes to identify particular isotopes producing radiation that impinges on the fiber. Changes in the polarization of light transmitted by the fiber can also be employed for radiation detection in accordance with aspects of the invention. Changes in the relative speed of two orthogonally polarized components of light transmitted by an optical fiber can also be employed as a measure of radiation reception.

A system and method according to the invention can be embodied in a variety of ways suitable for particular enclosures, containers, boxes, cartons, rooms and other three dimensional enclosures of any size and shape. A continuous optical fiber path is disposed in a medium which is part of or associated with a container and which encloses the volumetric space of the container. The optical fiber path provides a volumetric mass of optical fiber which is reactive to radiation from a radiation source in the container to cause an irreversible change in the light carrying capacity of the optical fiber. The change in light carrying capacity includes a change in the intensity (magnitude) of received light from the optical fiber path, or a change in frequency or other characteristic of received light. A light source is coupled to one end of the optical fiber path for introducing light having a predetermined characteristic. A light detector is coupled to the other end of the optical path for receiving light from the optical path. A circuit is coupled to the light detector and is operative to detect a change in the predetermined characteristic of the light and to provide an indication thereof.

BRIEF DESCRIPTION OF THE SEVERAL VIEWS OF THE DRAWINGS

The invention will be further described in the following detailed description taken in conjunction with the accompanying drawings, in which.

DETAILED DESCRIPTION OF THE INVENTION

Figure 1:
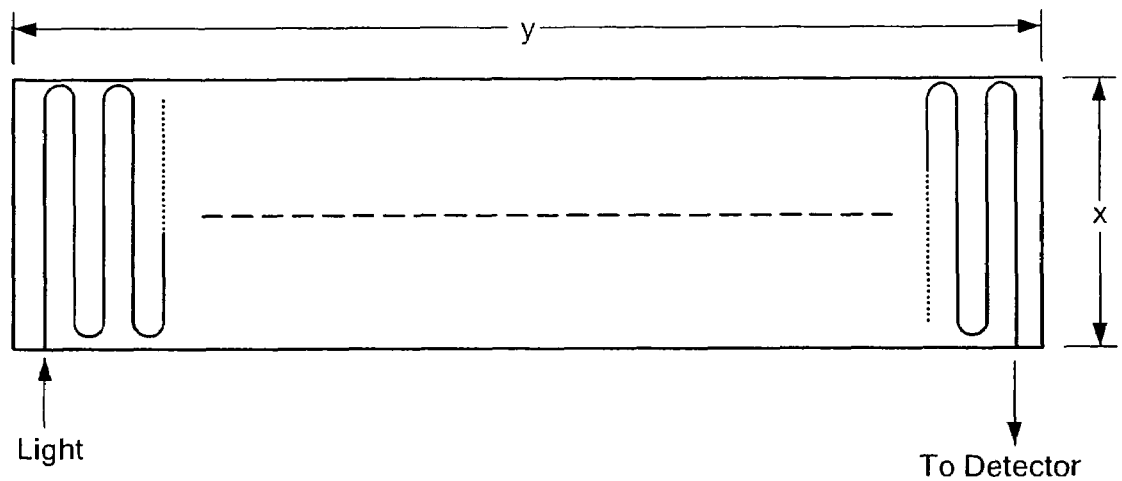
FIG. 1 is a diagrammatic view of a sensor panel having an optical fiber path, in accordance with the invention.

This application is related to the present inventor's U.S. Pat. No. 7,211,783 issued May 1, 2007, and U.S. application Ser. No. 11/444,160 filed May 31, 2006, the disclosures of which are incorporated by reference herein.

A single mode optical fiber, such as Corning SMF-28e, which has a glass core 8 microns thick covered by cladding 150 microns thick, is used to totally envelop the inside walls of a shipping container. A standard ISO 20 foot container will utilize approximately 15 km of optical fiber, and approximately 30 km of optical fiber is needed for a 40 ft container to create a ¼" spatial resolution between individual optical fiber strands. Other greater or lesser resolutions can be attained as a function of the length of optical fiber used. These are the two basic size standard shipping containers used in the maritime industry. The reason for using a single fiber as a continuous light path is because it can easily carry a light signal without repeaters or amplifiers for 100 km or more. A multi-mode fiber can also be used, but generally needs repeaters after 3 km, which involves more costs and has less reliability of transmission because of light losses due to the need for large numbers of optical connectors in the light pathway. Because the light signal is always on and operative upon closing the doors and sealing the container, the invention is designed to be fail-safe. If for any reason the presence of light is not detected by the photodetector circuit, an alarm is given. It makes no difference if the absence of the light signal is because of a severance of the optical fiber by intrusion, the light transmission is affected by radiation, or a failed component such as a power supply, an alarm will be given to thereby indicate a problem. Other detection systems depend on effecting an alarm upon a detection. If there is a component failure in these systems an actual alarm will not be detected.

There are four basic parameters for detection of radiation of any sort, i.e., gamma, neutron, alpha, beta (electrons), x-ray or nuclear fragments.

The first parameter is the physical size of the detector. In this invention the glass core and/or its cladding of the optical fiber serves as the physical detector. For a 20 foot container at ¼ inch resolution, for example, 15 km of optical fiber with a glass core of 8 microns and 150 microns of cladding would yield a physical detector measuring approximately 235 sq. centimeters with a thickness of 8 microns. For a 40 foot container, the measurement of the physical detector would be 470 sq. centimeters with a thickness of 8 microns. These dimensions are predicated on using Corning SMF 28e as a readily available commercial optical fiber with cladding and protective coating resulting in a total diameter of 250 microns, by way of example. There are numerous other suitable optical fibers available to design a physical detector with various surface areas, thicknesses and volumes to optimize the detection process, such optical fibers being known to those skilled in the art. Additionally, if required to enhance radiation detection by increasing the physical size of the detector, multiple layers of the optical fiber sensor can be used to increase the volume of the detector. The layer(s) may be encased in a protective sheathing of appropriate resin or other material, which binds the layer(s) of sensor liner to all six sides of the inside walls of the container in a robust and durable manner. The thickness of said resin sheathing can typically be ¼ inch thick, more or less, and will not reduce in any significant manner the cargo volume space within the container. By way of example, a 20 foot container has a volume of 1,250 feet$^3$. The volume of resin used at ¼ inch resin coating thickness results in a volume of 10 feet$^3$ which results in a loss of cargo volume of only 0.0078%.

In order to optimize the efficacy of a physical detection process, certain chemical dopants are added to the glass core during manufacture to sensitize the core to the effects of incident radiation which disrupt the atomic lattice of the glass crystals in the glass core, creating what are called "color centers", which induce a darkening of the optical fiber core, causing an attenuation of the transmitted light. The specific physical mechanism known as a "color center" that accounts for loss of light transmission (attenuation) in an optical fiber due to incident neutron or gamma ray radiation is the direct damage done to the crystalline structure of the optical fiber core (typically 8 microns in single mode fiber). In ionic crystals, the ions and vacancies always arrange themselves so that there is no build-up of one type of charge in any small volume of crystal. If ions or charges are introduced into or removed from the lattice, there will in general be an accompanying re-arrangement of the ions and their outer valence electrons. This re-arrangement is called "charge compensation" and is most dramatically observed in "color centers" within the optical fiber core. Thus, if certain crystals are irradiated with neutrons or gamma rays, a color change is observed.

Specifically, the radiation produces defects in the atomic lattice and in an attempt to maintain charge neutrality, the crystal undergoes some measure of charge compensation, causing either extra electrons or positive charges to reside at the defects. Just as electrons around an atom have a series of discrete permitted energy levels, so charges residing at point defects exhibit sets of discrete levels, which are separated from one another by energies corresponding to photons in the visible region of the spectrum. Thus, light of certain wavelengths can be absorbed at the defect sites and the glass core of the optical fiber appears to be colored, which effect reduces the intensity of light transmission causing attenuation. Additionally, the core can be manufactured with specific dopants designed to sensitize the production of color centers to particular frequencies of the transmitted light in the core. This means specific types of incident radiation and its associated energy level can correlate with certain wavelengths of the transmitted light which in turn can be absorbed at the defect sites. Thus, specific radiation can produce specific defects in the atomic lattice structure. This in turn attenuates or blocks the transmitted light in the core, on a basis that allows an identifying signature of the incident radiation and its attendant energy level to be established by comparing the emitted wavelength of the color center to a stored predetermined library of experimentally derived data.

For example, it is well known by persons familiar in the art that quartz may be colored brown by irradiation with neutrons. This data can be stored in a suitable memory and compared and measured by a suitable frequency analyzer associated with the photodetector at the end of the transmission path of the optical fiber. This detection and radiation identifying technique is especially effective if the diameter of the optical core is made close in relative size to the size of an atom, such as where the size of the glass core of the optical fiber is of the order of one to eight microns or even in the range of nanometers. While only certain light frequencies are appropriate to use for transmission at frequencies to detect the creation of a color center, an extraordinary feature of this invention is to initiate the operation of the detection process by using a light source with a constant intensity and preselected frequency. Upon the slightest change in either intensity or frequency of the transmitted light due to the creation of a color center, the photodetector circuit is operative to go into an alert status to start a process of analysis of frequency and intensity of the detected light. The alert status of the photodetection circuit will assume a radiation source has been detected within the container, and is causing one or more color centers to be created within the core of the optical fiber. Upon certain preset limits of light intensity and/or frequency programmed within the photodetection circuit being exceeded, the photodetection circuit will activate a "Fourier Chip". Such a Fourier Chip is a Fast Fourier Transform (FFT) processor or analyzer for determining the sine wave composition or multiple sine wave compositions, of the coloration or spectrum of the color center or centers. Such a processor can be implemented by a general purpose computer or microprocessor containing FFT software or by a special purpose computer or microprocessor. Such apparatus is per se known in the art, samples of which are the microprocessor chips of Intel, AMD and others, and specialized apparatus such as TEK Microsystems-QinetiQ Quixilica.

The Fourier computer chip can store in its memory a library of specific color center sine waves that directly correlate with the known effects of a specific type of radiation, which induces creation of specific color centers. The output of the Fourier chip analyzer can also be used to tune a variable laser light source at the input end of the optical fiber light path to test the effect of changing the frequency of the light source in order to determine if such action amplifies the attenuation in the optical fiber or light inhibits the attenuation, all by measuring and comparing successive light intensity readings of the photodetector with prior measurements or with an appropriate running average of measured light attenuation in the optical fiber or by the use of some other mathematical signal analysis technique known to those in the art. Thus, through a programmed iteration of changing frequencies and measuring concomitant attenuation readings, it will be possible to optimize the detection sensitivity level of attenuation due to the creation of color centers induced by radiation, as well as to optimize the rate of growth of color centers in response to the incident radiation.

Additionally, certain "tag isotopes" such as U232 which has a very specific radiation signature, can be stored in the memory for easy detection. Major nuclear powers use this "tag isotope" to facilitate detection, as well as other tags for mutual protection against non-proliferation.

By the use of a variable tuning laser light source it is possible to accelerate the rate of growth of "color centers" by homing in on the light frequency, which because of certain dopants used in the manufacture of the optical fiber, will maximize the rate of darkening (attenuation) of the optical fiber. This will make the optical fiber sensor more sensitive to detecting smaller amounts of radioactive material in the shortest time interval. The rate of darkening (attenuation) is a unique concept and invention as described in patent application Ser. No. 11/444,160 incorporated by reference herein. As shown graphically in FIG. 1, the rate of darkening (attenuation) is in direct correlation to the exponential time constant in the half-life decay formula $N=N_o\exp(-\gamma t)$, whose single equation describes all radioactive processes. Hence, the single parameter of difference used for isotope detection and identification is the time constant for decay which is unique for each radioactive isotope. The correlation of the rate of darkening can therefore be matched against a stored program library of any number of isotopes likely to be found in a nuclear or radiological weapon. This library can be stored in a memory which can be part of the Fourier analyzer computer chip.

Thus, the rate of darkening serves to identify, by its half-life signature, the specific type of radioactive isotope being detected. The ability of the Fourier computer chip to detect a change in the light source, perform a sine wave frequency analysis of the output light detected, and then use that frequency analysis as an input signal to vary the frequency of the laser light source creates a resonant frequency to gain amplified detection of darkening with greater clarity of signal. This feature of the invention serves to maximize the efficiency of separating the signal evoked by the impact of radiation on the optical fiber from the surrounding background radiation which is constantly present. This feature of the invention is based on the same type of mathematical analysis and data processing used in scintillation counting, whereby detected scintillation counts of particle detection add linearly and emerge to be detected out of the background radiation noise which adds at a slower random rate. The idea is that the background radiation counts are subject to the "central limit theorem" (many sources) and so their fluctuations from the mean rate grow proportionally to the square root of time, whereas a single source, however weak, contributes a constant number of radiation counts per second growing steadily over time. After enough time the weak radiation source can be unambiguously detected from the background as is well known. This feature of the invention also facilitates the minimization of the time interval to make detection of the induced darkening and triggering an alarm signal. Additionally, the tunable laser light source feature can be programmed to not only generate a steady constant light source but a modulating waveform with various characteristics such as a sinusoid, a linear digital pulse train, and slices of digitally represented impulse waveforms.

In addition to the above technique to enhance detection of a radiation source within a volumetric space such as a cargo container, there are a family of dopants that when manufactured into the glass core of an optical fiber serve to greatly sensitize the glass core to the destructive effects of radiation impacting the glass core and damaging its crystalline atomic lattice structure. The most important of these is natural gadolinium and also isotopic enriched gadolinium 157. The dimension of a deBroglie wavelength associated with neutrons at thermal energies (less than 1 eV) is about the same as crystal interplanar spacings, that is about one angstrom. As reference background, gadolinium especially in the presence of ultra-cold neutrons (very weak energies) has the largest nuclear "cross section" ever observed. It exhibits the highest absorption cross section of stable isotopes due to resonances near the threshold energy. Natural gadolinium has a cross-section of 49,000 Barns; gadolinium 157 has a cross-section of 254,000 Barns. This means that the use of gadolinium as a dopant in the glass core of the optical fiber creates a much higher probability that a thermal neutron will destructively interact with the nucleus of a gadolinium atom embedded in the crystal atomic lattice of the crystals comprising the glass core and cause the creation of a color center, thereby attenuating the transmission of light in the optical fiber. While ultra-cold neutrons effect on gadolinium are discussed because of their dramatic effect on producing the largest nuclear cross-section ever observed, the effect is also significant for the more energetic thermal neutrons which typically might have an energy of 0.025 eV; though not as great in producing ultra large cross-sections because they have a smaller deBroglie wavelength than the ultra-cold neutrons.

A slow neutron is by definition a neutron in a low energy state of approximately one electron volt or a fraction of an electron volt. Such slow neutrons are free neutrons and are called "thermal neutrons" as opposed to highly energetic neutrons in the kilovolt or megavolt energy range, which is their energy range when bound within the nucleus. Neutrons in effect have "variable size" according to the wavelength associated with their energy state, all as described by the de Broglie wavelength formula:

$$\lambda = \frac{h}{mv}$$

where $\lambda$ is the wavelength of the neutron, m is the mass of the neutron, v is the velocity of the neutron, and h is Planck's constant. If a neutron from a radioactive source is slowed by use of a moderating material to about 0.1 electron volt, it will have a deBroglie wavelength of approximately $10^{-8}$ centimeters, approximately the size of an atom. At this size, the probability of a neutron affecting the structure of an atom within a crystal lattice structure of a glass core as exists in an optical fiber is high. Simply put, a thermal neutron spends more time near a target gadolinium nucleus than a fast moving energetic neutron. In particular in gadolinium, the likelihood of absorbing a thermal neutron is larger than other nuclei because the spacing of several nuclear energy levels is right, just as an atom is most likely to absorb a photon with the correct frequency to excite atomic transition. The huge cross-section for gadolinium in effect makes the nucleus look enormous to the neutron, close to the size of the whole atom. There are other dopants well known in the art, such as boron 10 and lithium that can be used to sensitize the glass core of optical fiber to the destructive effects of thermal neutrons, thereby detecting radioactive materials which emit neutrons. Neutron emissions virtually define a single criterion necessitating inspection of the source.

Neutrons in turn can be slowed to the thermal energy range by the use of moderating materials of small atomic weight, such as borated polyethylene. Such moderating materials can be used in sufficient amount to slow down enough neutrons from the radiation source to have a sufficient number of thermal neutrons to interact with dopants, such as gadolinium in order to ensure a significant measurable destruction of the optical light transmission pathway ensuring detection of the induced attenuation (darkening).

Except for a few gamma rays, the only penetrating radiation emitted by plutonium are neutrons from spontaneous fission. The alpha particles and x-rays are weakly penetrating radiation. Plutonium isotopes with even mass numbers decay by spontaneous fission and are thus neutron emitters. The actual total neutron emission of plutonium will depend on its mass, chemical form and isotopic composition. By way of example, weapon grade plutonium will be 94% Pu239 with 6% Pu240, while reactor grade (dirty plutonium) has larger amounts of even numbered isotopes. A neutron emission rate for 1 gram of Pu240 would be 920 neutrons per second. This is a detectable fluence within the confines of a container, and cannot be mistaken for random background events which typically might be neutron counts of only 0.06 neutrons per second for a volume the size of a container. This background level for neutrons is so low, the detection of a few neutrons within seconds definitively indicates the presence of a neutron source within the container. The spontaneous emission of a neutron due to fission in a source of highly enriched uranium is at a count of the order of one spontaneous fission per hour for a gram of material, which is significantly lower than plutonium. The detection techniques enumerated herein will be the same other than requiring significantly longer detection times but all well within the time duration of a typical container transit time. Thus, even the difficult detection signatures of plutonium and especially difficult highly enriched uranium can be detected because of the combined efficacy of: 1) using neutron moderating materials in the resin coating or cladding/sheath of the optical fiber to slow a sufficient number of neutrons to the thermal range as they emit from a radiation source within the container; 2) using a highly radiation sensitizing dopant in the optical fiber core, such as gadolinium; 3) have pre-configured distances from the radiation source constrained not to exceed four feet; 4) always being assured of an optimal solid angle of emission from the radiation source, because where ever the solid angle of emission is pointing it will always intersect perfectly with some location on the totally enveloping optical fiber sensor liner which covers the entire inside surface of all six sides of the container; or for any three dimensions of any geometrical object that has volumetric space; 5) continuous detection sensing for the entire time of the container transit will ensure the highest probability of detecting a small radiation emission signal within the midst of some constant of normal background radiation. In addition, gadolinium or other sensitizing dopants can also be embedded in the optical fiber cladding close to the cladding/core interface boundary. A color center created by radiation at this type of location would allow significant light leakage to take place, thereby increasing overall attenuation of the transmitted light. Neutron emission is the single most important signature of the presence of a plutonium or uranium source, as well as various types of radiological sources such as cobalt 60 or radioactive iodine.

The second parameter of importance for detecting a secreted radiation source within a container is the solid angle of emission of the radiation from the radioactive source. Since the optical fiber detection liner envelopes the entire inside volume of the container, there will always, by geometric definition, be an optimal solid angle of radiation emission incident upon some part of the optical fiber lining with maximum effect. The attenuation effect on the single continuous optical path is cumulative as even infinitesimal increments of attenuation at different sections of the fiber are continuously summed as an integration function (Fx) to amplify the darkening of the optical fiber. In integral calculus this is equivalent to integrating infinitesimal slices of a cylinder to compute the darkened volume of the cylinder. If for any reasons this integral cannot be evaluated in elementary functions to compute the amount of darkening per unit time; a methodology of mathematics known as catastrophe theory to expand the integral into a computation series is known to those skilled in the art. The total or partial attenuation of light transmission will trigger an alarm signal indicating the presence of radioactive isotopes emitting various radiation particles. It is the absence or presence of radiation or darkening (attenuation) to a threshold level, which is sought for initial alarm purposes, much like the functional use of an electrical fuse indicates an electrical problem in a house on a reliable yes or no basis. Additionally this detection system is fail-safe because the detection process which signals an alarm is predicated on the absence or presence of photodetection of the transmitted light along the single continuous light path. It makes no difference if the absence of a detectable light signal by the photodetector is caused by the effect of radiation impairment, or by the fiber being cut by physical intrusion, or due to a power source, light source or other equipment failure. An alarm signal is automatically generated for any of these causes. This is in opposition to a scintillation process where the absence of a light signal may be caused by a defective part and not by a lack of radiation signals.

The third parameter of importance is the distance between the secreted radioactive material and the radiation detector. The degree of difficulty of this measurement parameter for detecting radiation is greatly simplified because this invention completely envelopes the entire encapsulated volumetric space because of the inherently limited geometric dimensions of the container size. The longest distance between any space within an ISO 20 foot long or 40 foot long container and the optical fiber detector lining the interior walls is 4 feet, as specified by the 8 foot×8 foot height and width dimensions of the ISO container(s).

The fourth parameter of importance for detection of the presence of radiation is time integration. This is optimized because the radioactive material of any source such as a secreted radiological weapon or nuclear device or bomb rides with the container detection system for the entire length of the trip. This is a time-of-integration amplification for radiation detection of approximately 100,000 to 1, comparing the seconds of time of a container on an ocean trip to the typical 10 seconds a radiation pylon monitor may sweep the same container when it leaves port. A ten day ocean trip is comprised of 864,000 seconds. A 40 foot container typically drives by fixed radiation measurement pylons at 6 miles per hour or 9 feet/second. Hence a 40 foot container may spend 5 or 10 seconds on average being scanned by a conventional scanner. The invention creates a measurement of time integration amplification of approximately 100,000 to 1. Additionally since radiation is inherently a statistical process, the ability to minimize the impact of errors from all sources in the measurement process of particle counting for integration of signal, the longer the time of counting the smaller the error in measurement. This is understood in the art by use of a simple standard deviation correction in the form of $\pm\sqrt{M}/t$ which means that the correction for a given counting rate varies inversely as the square root of the time of counting. Hence the greater the time of measurement, the smaller the error in measurement.

The natural environment contains a near constant level of radioactive emissions which are mainly gamma rays at roughly 300 milli-rems per year on a nearly even global basis. Neutrons within an atom's nucleus of a non-radioactive element are stable particles. When a neutron is ejected from the nucleus of a radioactive isotope it becomes a very unstable particle, with a lifetime of approximately 15 minutes (ref. particle data groups—review Particle Physics 2006) before it decays into a proton, electron and an electron antineutrino. This is the only possible decay mode via the weak force. The presence of free neutrons can only mean one thing, i.e., the presence of a radioactive isotope. There are several thousands of isotopes, many which are unstable that change into stable forms by emitting gamma rays, beta rays (electrons), alpha particles and neutrons. The most stable form of a particular element contains neutrons in the same numbers as protons in the nucleus. A number of neutrons much larger or much smaller than an equal number of protons within the nucleus, and the neutrons will give rise to an unstable nucleus, that is a radioactive-isotope.

An emitted neutron from a radioactive source has an increasing probability of hitting the electrons of an atom or a nucleus of an atom, and either shattering the nucleus or being captured by the nucleus and making the nucleus unstable if the neutron is "slow". As noted above, if a neutron is slowed from a radioactive source to about 0.1 electron volt, it will have a wavelength of approximately $10^{-8}$ centimeters, approximately the size of an atom. At this size, the probability of a neutron affecting the structure of an atom in a crystal lattice structure of a glass core such as the glass core of an optical fiber is high. In ionic crystals, the ions and vacancies always arrange themselves so that there is no buildup of one type of charge in any small volume of the crystal. If ions or charges are introduced into or removed from the atomic lattice, there will in general be an accompanying rearrangement of the ions and their outer valence electrons. This rearrangement is called "charge compensation" and is most dramatically observed in "color centers". If certain crystals are irradiated with gamma rays or neutrons, a color change is observed. For example, quartz may be colored brown by irradiation with neutrons. This radiation produces defects in the lattice structure, and light of certain wavelengths can be absorbed at the defect sites, and the material appears to be colored. This, in turn, partially attenuates the transmitted light or totally blocks the transmitted light in the optical core, especially if the diameter of the optical core is made close in relative size to the size of an atom, where the glass core of the optical fiber is of the order of 1 micron (millionths of a meter) or in the range of nanometers (nm).

An ultra thin optical fiber glass core can exhibit very small transmission loss only if its diameter is greater than a threshold value, (determined by the wavelengths of the transmitted light, and such complex phenomenon as material dispersion resulting from the different velocities of each wavelength in a material. In general, optical fiber is more sensitive to shorter wavelengths with peak absorption in ultra-violet.) An optical fiber with a glass core in this small diameter range using short wavelength light in the 400 nanometer range (violet light) even ultraviolet light in the range of 400 nm down to 4 nm can be configured to significantly detect the presence of free neutrons. It is well known in the art that short wavelengths of light will sensitize optical fiber to attenuation in the presence of radiation.

FIG. 1 shows a sheet or panel with dimensions X and Y which contains a single continuous ultra-thin optical fiber, which can either have its own individual cladding wrap, or the glass core can be laid down in a suitable "communal" cladding material that is integral for the entire glass core as a single cladding coating, yet preserving the necessary glass core/cladding properties of specified refractive indices within certain critical ratios, to insure no loss of transmitted light in the optical fiber unit all in accordance with Snell's Law. The benefit of this communal construction is that an ultra tight packing of a single ultra thin optical fiber in very close proximity to its adjacent strands creates the physical effect of having a large area detector surface which is what is desired for increasing the sensitivity of neutron, gamma ray, alpha particle, and electron detection. This configuration also has a significant advantage in amplifying the detection of small numbers of neutrons or other types of radiation. If any unit cells of the crystal lattice structure within the glass core of a single optical fiber strand is hit by a neutron or other radiation, it has the effect of reducing or shutting down the transmission of light within that particular single continuous optical pathway, even if no other parts in front of or behind that particular portion of the optical pathway are affected by any radiation.

A single flat non-differentiated plate detector, such as a lithium film badge known in the art, must absorb many radiation particles on a cumulative basis in order to darken and hence visually or by instrument measurement indicate the presence of radiation. With the present invention, very low levels of neutrons and other radiation particles can make their presence known by the geometric leveraging scheme provided by the invention. By way of example, assume that in FIG. 1 X is 2 inches and Y is 2 inches for an area of 4 square inches. Say darkening is observable at 20% of the area of 4 square inches or 0.8 square inch. If the optical fiber has a glass core of 1 micron and cladding of 9 microns in thickness for each adjacent optical fiber, and it only takes the radiation destruction of a single optical fiber strand of either just the core or the cladding or both, in the 4 square inch area to attenuate the transmitted light in the single optical pathway to near zero or some detectable attenuation level; then the ratio of amplification of detection is: 10 microns, i.e., the diameter of a single optical fiber where a "color center" developed and stopped or reduced the light transmission, divided into 0.4 inches (20% of one side of 2 inches×2 inch film badge) or one centimeter. One centimeter is a hundredth of a meter and 10 microns is a hundred thousandth of a meter. Therefore the amplification for detection is 1000 to 1 which is a significant improvement because the invention striates the flat and non-differentiated area into a single continuous light path which being damaged by radiation in any individual sector attenuates or stops the light transmission totally. Such amplification is applicable to optical fiber covered areas of larger or smaller size on any type of substrate as well.

Figure 5:
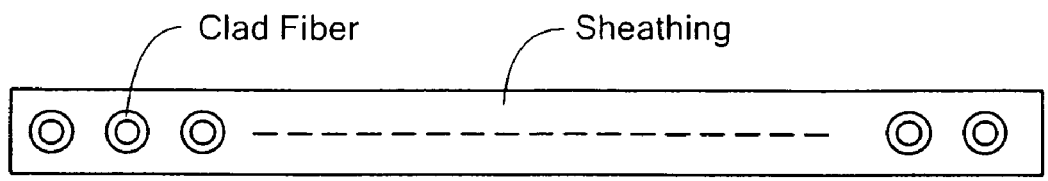
FIG. 5 is a diagrammatic end view of a sensor panel having a clad optical fiber retained in a sheathing material.

In order to ensure neutrons are sufficiently slowed or moderated in their energy to create larger deBroglie wavelengths, a neutron affinity material such as gadolinium or boron 10 can be used. The moderating material can be included as an ingredient of the fiber cladding, or can be in a separate sheath or other protective layer surrounding the cladding layer such as a resin coating of a pre-determined thickness. The purpose of this feature of the invention is to ensure that some minimum threshold of thermalized neutrons reach the optical fiber core/cladding detector, notwithstanding losses of neutrons by capture by the moderating material itself, as well as other neutron losses in the thermalization process. Alternatively, the moderating material can be present in the communal cladding, such as shown in FIG. 5, or can be in separate layers sandwiched over the optical fiber path. There are various other moderating materials such as graphite and beryllium, to slow the neutrons from a radioactive source within the container that may be used in various combinations for likely radiological weapons or plutonium or uranium weapons. These combinations of moderating materials are known per se in the art and can be optimized for slowing neutrons from known radioactive materials with known emission energy profiles to increase the effective cross-section (BARNS) for capture or interference with the nuclear or atomic structures of the glass core and thereby increase the detection sensitivity. Additionally certain materials have very specific neutron resonance capture sensitivities that can be used to facilitate detection sensitivity. The shielding of a nuclear or radiological weapon within a container by terrorists will thwart detection by radiation pylons outside the container, but may have the unintended consequence of thermalizing neutrons and facilitating detection by the invention inside the container.

The above described invention and process can be likened to taking a 24 lane highway where a single car accident may not impede traffic much, and converging it to a single traffic lane where one car accident will stop traffic in its entirety. In this example the cars may be thought of as individual photons of the single continuous pathway of transmitted light in an ultra-thin optical fiber which is akin to a single traffic lane.

Figure 2:
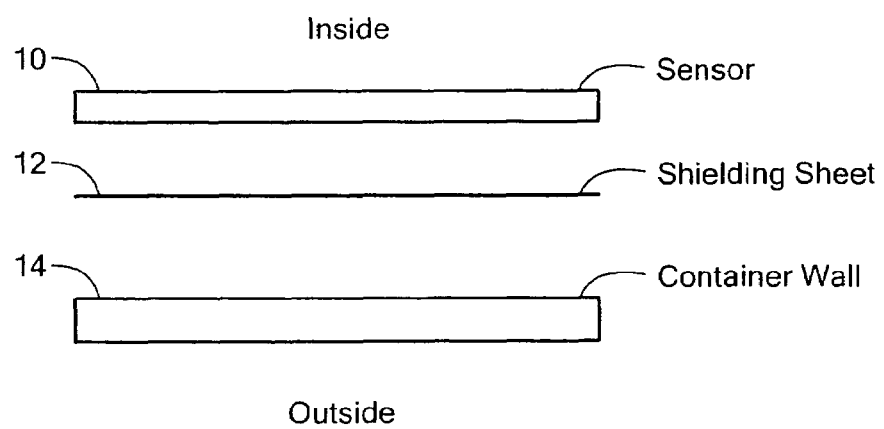
FIG. 2 is a diagrammatic view of an embodiment of the invention having a single shielding sheet.

In another embodiment of this invention a thin radiation shielding sheet, such as lead or tungsten, can be placed between the inside wall of the container and the outside sandwiched layers of the optical fiber liner to isolate the interior of the container from extraneous radiation sources outside of the container that for one reason or another may be present, such as, from natural sources or from adjacent merchandise. This may include products such as bags of kitty litter (which contains particles of granite, which contains very low levels of radon, a daughter isotope of radium) and also thorium, bananas, which emits low levels of potassium 40 radiation, or building materials which emit low levels of radiation, such as thorium and cesium 137, or certain medical materials which emit cobalt 60 radiation. This embodiment is shown diagrammatically in FIG. 2. The sensor liner or sheet 10 has a radiation shielding sheet 12 disposed on the surface of the liner which faces outward of the container. The shielding sheet 12 is positioned between the container wall 14 and the confronting surface of the sensor liner 10. Extraneous radiation from sources outside of the container are blocked or attenuated by the shielding sheet, with a result that the sensor is exposed only or substantially only to some level of thermal neutron radiation. Since the partial shielding sheet will not stop highly energetic neutrons which will have a small probability of interacting with the optical fiber sensor because their deBroglie wavelength will be small not to interact with a nucleus which has a diameter approximately $10^{-14}$. The design of the shielding sheet only has to be thick enough to slow down some minimum number of neutrons to the thermal energy level, yet taking into account there will be some loss of thermal neutrons, before they can interact with the optical fiber detector.

Figure 3:
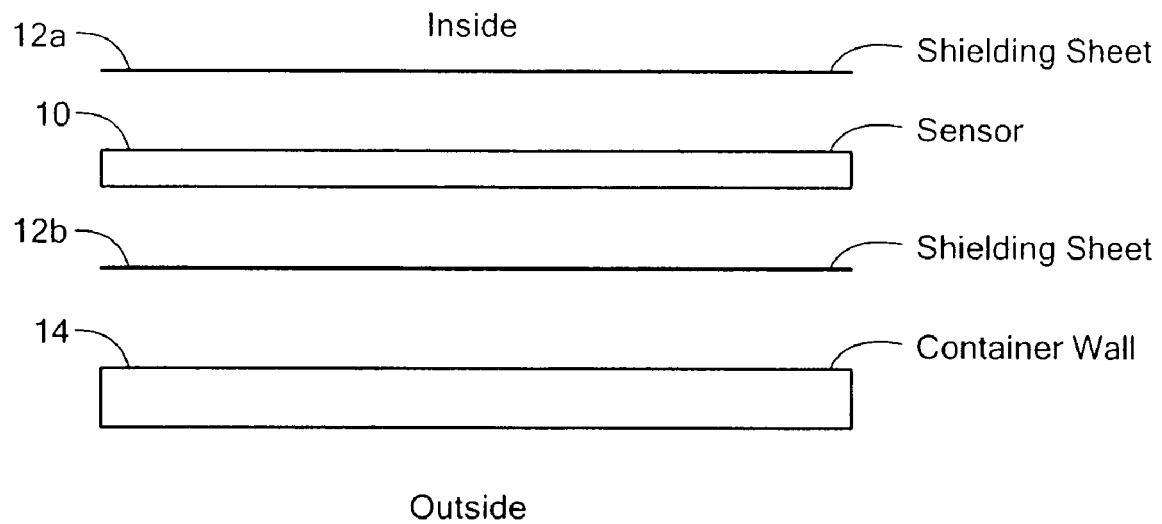
FIG. 3 is a diagrammatic view of another embodiment of the invention having two shielding sheets.

In another embodiment, both sides of the fiber optical sensor can be covered with thin shielding sheets. If there is a radiation source within the container emitting both gamma rays and neutrons at very low levels, the inner shielding sheet would block the gamma rays but not the neutrons. The outer shielding sheet will block gamma rays from outside the container. Neutrons will still pass through the shielding sheet in some number, be thermalized and be detectable by the optical fiber. This configuration can be used to separate and filter out the effects of gamma rays such that free neutrons can be detected without ambiguity. The detection of free neutrons would signify the presence in the container of highly suspicious radioactive material. For some purposes where external radiation is not an issue, only the inner shielding sheet can be employed to filter gamma rays being emitted from a source in the container. This embodiment is shown in FIG. 3. The sensor liner has a shielding sheet 12a and 12b disposed on each surface of the sensor. One of the shielding sheets is between the container wall 14 and the confronting sensor surface. The other shielding sheet is on the surface of the sensor facing the interior of the container, or between the interior facing surface of the sensor and the container wall.

Figure 4:
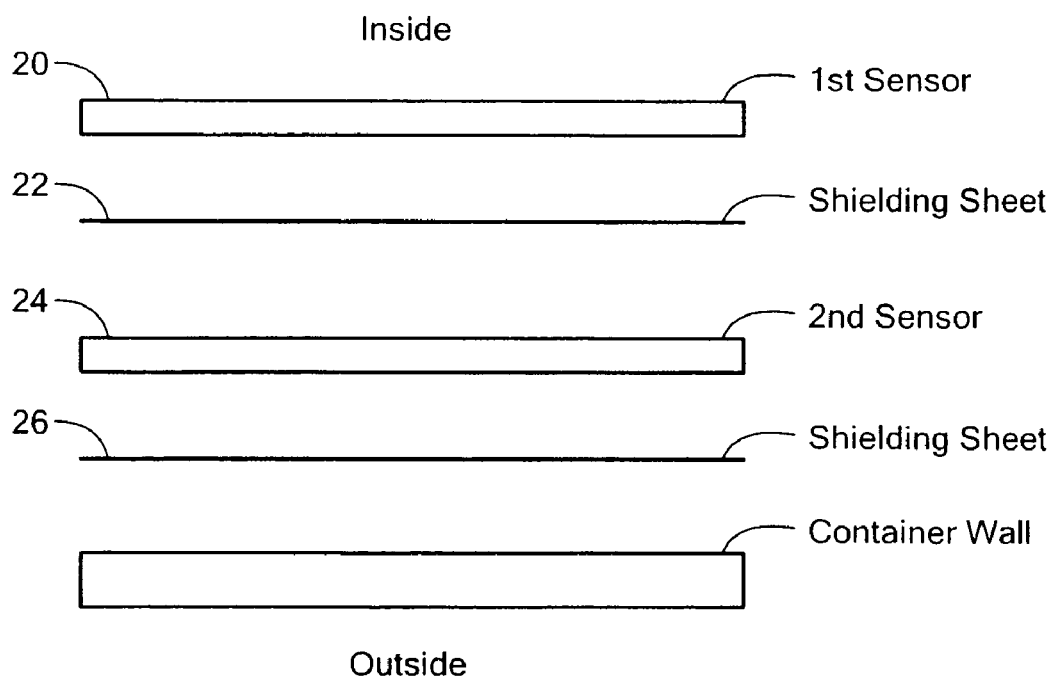
FIG. 4 is a diagrammatic view of yet another embodiment of the invention have two sensor panels and two shielding sheets.

Alternatively, a double sandwich construction could be made that allows an inner sensor to detect all radiation. A first shielding sheet would screen out internal gamma sources, allowing only thermal neutrons to interact with a second inner sensor which, being shielded on both sides by lead sheets to stop gamma rays, will only be sensitive to neutron detection. This version is shown in FIG. 4. A first sensor 20 has a surface confronting the inside or interior of a container. A shielding sheet 22 is interposed between the opposite surface of the first sensor and one surface of a second sensor 24. A shielding sheet 26 is disposed on the other surface of the second sensor. The first sensor 20 can detect all radiation emanating from inside the container, and provide a signal indication thereof. The second sensor 24, being shielded on both sides by shielding sheets, detects neutrons and provides a signal indication of such detection. The output signals from the first and second sensors can be suitably processed to provide discrimination between neutron and other forms of detection. It is well understood in the art that many radioactive isotopes have known fixed ratios between gamma and neutron radiation particle counts per unit of material, and specific profiles of energy of intensity of gamma radiation and neutron radiation, as well as being in fixed ratios of emission energy levels per unit of time. These ratios can be compared with known radioactive isotopes creating signature profiles for the identification of the specific radioactive source material. The signature profiles can be stored in memory and used to compare measured ratios to identify specific radiation sources.

Additionally, in another aspect of this invention, the individual optical fibers, having by way of example a core of 1 micron and cladding of 10 microns, or individual fibers constructed in a "communal" cladding material, can all be further embedded in a suitable epoxy resin base, such as the "Fiber Glast" 2000. The epoxy resin provides structural bonding support to the inside walls of the container, as well as protection of the optical fiber from damage by rough handling, which is usually present in shipping industry operations. This protective epoxy resin base, which hardens shortly after application, can also be used for additional functions. It can contain a suitable mix of neutron affinity material such as boron 10 or borated polyethylene as the moderating material to slow down neutrons to "thermal energy levels" in order to increase the probability of an "enlarged" neutron, according to the deBroglie wavelength formula, not only damaging the atomic lattice of the glass crystals in the glass core, but also damaging the glass crystals in the boundary zone of the core and the cladding. This will have the effect of destroying the required constant ratio of indices of refraction between core and cladding as required for total internal reflection of the transmission light within the optical fiber core. This creates leakage or loss of transmitted light, in addition to the creation of "color centers" directly in the optical core or cladding or both. Either one or both effects will result in either a total loss of the transmitted light in the optical fiber or a measurable attenuation of the transmitted light, indicating the presence of neutrons or gamma rays or alpha particles being emitted by a radioactive source within the container.

Figure 6:
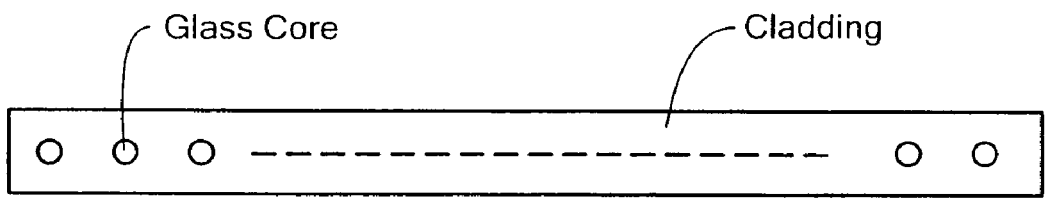
FIG. 6 is a diagrammatic end view of a sensor panel having an unclad optical fiber core retained in a communal cladding material.
Figure 7:
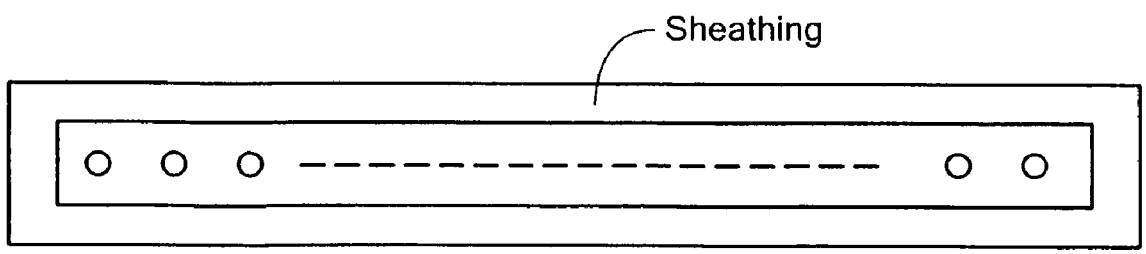
FIG. 7 is a diagrammatic end view of the sensor panel of FIG. 6 showing a sheathing material over the communal cladding material.

By way of illustration, FIG. 5 shows clad optical fiber disposed along its optical path in a sheathing material. A communal cladding material is shown in FIG. 6 in which an unclad glass core of the optical fiber is disposed. A sheathing material can be provided around the communal cladding as shown in FIG. 7.

The communal cladding material and/or the protective resin of a designed thickness in which the optical fiber is contained can enhance the ability of the optical fiber sensor to detect a physical intrusion into the container such as an attempt at drilling through the sensor liner sheet. The optical fiber has a resolution of ¼" (or some other suitable resolution) between adjacent optical fibers which is presently dictated by the optical fibers available in the market which meet the necessary specifications. These fibers have a bend radius of ¼". A bend less than ¼" causes a significant loss of light or breakage of the core of the optical fiber. A drilled hole or aperture smaller than ¼" could be drilled between adjacent fibers which might avoid breakage of the fiber, in which case the breach of the liner would not be detected. This is not a likely scenario in that an intruder attempting to drill through a container wall would not know the position of the optical fibers because the resin coating contains dark pigment, and avoidance of the individual fiber strands during a drilling operation would be by random chance and not be likely. Nevertheless, to further reduce the chance of such a drilling operation succeeding, the communal cladding and/or protective sheathing material and/or the resin material can be made, such that; an attempt at drilling a small hole through the material will cause cracking or distortion of the material which will result in damage or breakage to the embedded optical fiber. This will cause an absence or a reduction in light transmission thereby causing an alarm signal.

In alternative implementation, the resin material can be embedded with chards of Velcro or other hard or abrasive particles or strands which would likely catch onto a drill bit and cause scything and abrasion of the optical fibers to thereby break the fiber or cause decrease in light transmission, and trigger an immediate alarm. The above embodiments of the invention increase the security features of the container further, by making it virtually impossible to insert lethal aerosol, biological or chemical materials into the container by a small tube, such as a hypodermic needle.

In another embodiment of the invention the problem of separating neutron or gamma ray signals from naturally occurring background radiation is readily achievable by the use of specific geometric configurations of the optical fiber sensor liner panels. Background radiation for a given location, such as latitude, altitude, specific geographical locations as with geological areas of uranium deposits is usually fairly uniform and isotropic. This is particularly true for a small enclosed volumetric space of interest such as a container or other three dimensional structure that is insignificant to a much larger local volumetric space, such as a geographical location at sea at a particular latitude that receives cosmic radiation from outer space. Alternately, a container encompassing a small volumetric space compared to the large volume of space encompassing a large area of land at a high altitude or near a mountain that has radioactive deposits is insignificant in volumetric proportion. Globally, there is a fairly uniform cumulative background radiation of 300 millirems per year from all sources, such as cosmic rays, radon in the ground, the effects from modern civilization including various radiation emitting products, and the lingering effects of prior nuclear weapons tests.

A significant feature of this invention is to use the unique geometrical construction of the invention to solve the extraction of the radiation signal from the background noise, not by sophisticated mathematical processing techniques, but by analysis of the geometric pattern of the individual sensor liner panels of optical fiber that comprise the entire liner of the six sided container.

Nuclear radiation emanating from a source is usually anisotropic and therefore has a preferred direction along which the radiation is of greater intensity than along other directions. Background radiation from the environment or from commercial cargo shipped within containers, is generally uniform and isotropic. The sensor panels lining the walls of a container will receive approximately uniform radiation from the isotropic background radiation, and the panels aligned with the preferred direction of emission from a nuclear or radiological source within the container will receive additional radiation above the level of background radiation. By measuring the ratio of darkening or rate of darkening, of each panel to the other panels or to a master single sensor panel in which a single continuous light path of optical fiber is provided, or some combination thereof, it is possible to ascertain that there is anisotropic radiation coming from a source within the container that cannot be mistaken for the isotropic background radiation from the environment or from other legitimate materials within the container.

Figure 8:
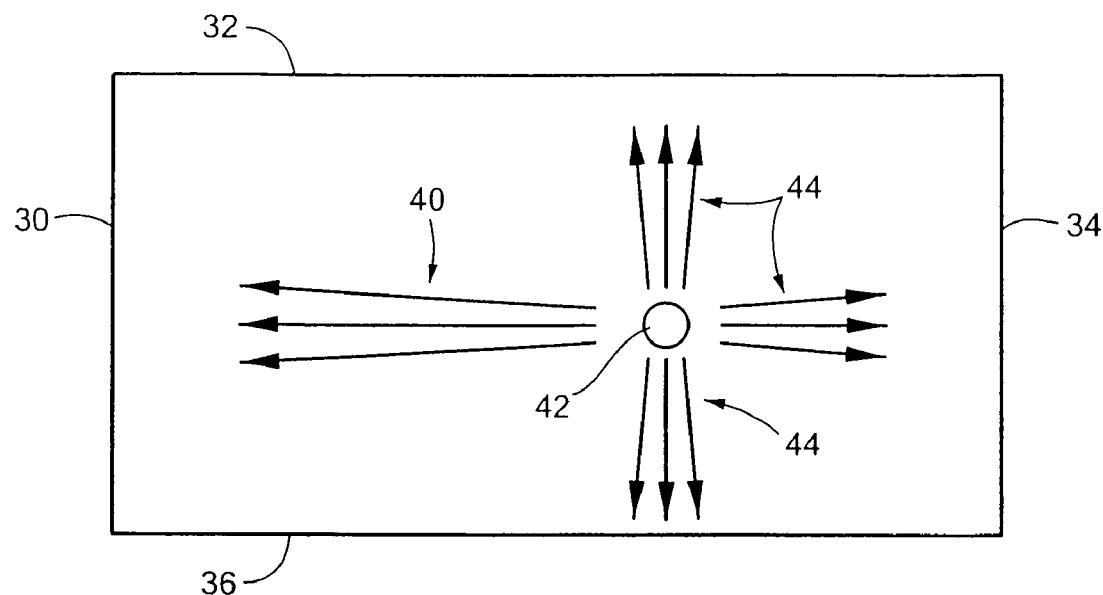
FIG. 8 is a diagrammatic view illustrating the anisotropic radiation from a source located in a container.

Referring to FIG. 8, four sensor panels 30, 32, 34 and 36 of a six sided container are illustrated. Each sensor panel has an optical fiber therein encompassing substantially the entire area of the panel and providing a continuous light path as discussed above. A light source and a light detector are provided for each panel and the light path thereof. The light detectors are coupled to a processor which is operative to compare the magnitude or intensity of the light emanating from each of the panels and to provide an output indication in the event that at least one of the detector signals from a respective panel exceeds the magnitude of the signals from the other panels by a predetermined threshold amount. Since the entire interior of a container is encapsulated in all directions, the solid angle of emission from an emission source in the container is automatically constrained to optimally irradiate one or more panels independent of how the secreted nuclear or radiological material is positioned within the container, either upon initial loading of the container or if the cargo within the container shifts during transit. As noted above, one or more of the sensor panels will receive a preponderance of radiation because the radiation source in the container produces radiation preferentially along a given direction or axis. This is illustrated in FIG. 8 by the longer arrows 40 representing preponderant radiation from a source 42, and by the shorter arrows 44 representing background radiation. Panel 30 receives the radiation of greater intensity and provides an output which can be distinguished from the background radiation by circuitry per se known in the art.

Figure 9:
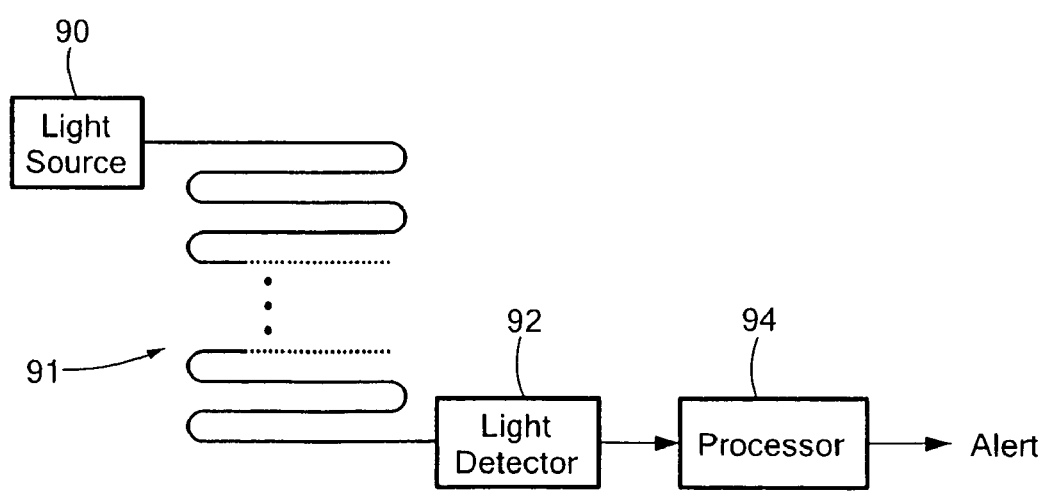
FIG. 9 is a block diagram of the signal processing from an optical fiber path.

FIG. 9 shows a sensor panel having an optical fiber path therein. One end of the optical fiber path 91 is coupled to a light source 90, and the other end of the optical fiber path is coupled to a light or photodetector 92 which provides an output signal to a processor 94. The processor provides an alert signal for alarm indication and other reporting purposes.

Figure 10:
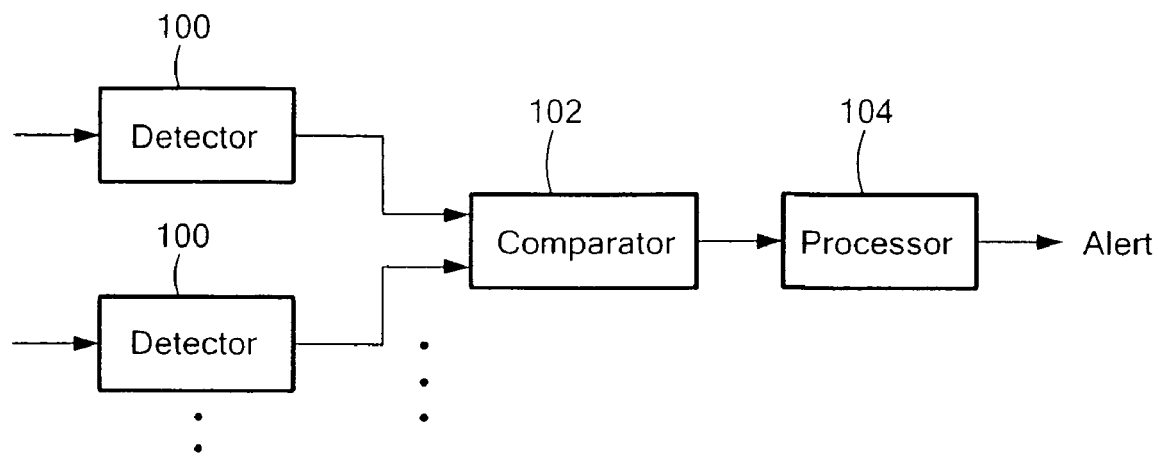
FIG. 10 is a block diagram illustrating a signal processing system having multiple light detectors.

FIG. 10 shows a plurality of light or photodetectors 100, each of which receives light from respective optical fiber paths which enclose a protected volume, and which provide output signals to a comparator 102. The comparator is operative to compare the relative signal strengths of the signals from the detectors 100 and to provide a signal to processor 104 which represents the detector output of greatest magnitude and which signifies radiation from a source inside the protected volume and of a magnitude greater than background radiation.

In an alternative embodiment, a single continuous optical path can be provided through all of the six panels lining the container. This single continuous optical path is in addition to the multiple paths provided by the respective liner panels described above. A light source is provided for the single optical path at one end thereof, and a light detector at the other end thereof provides an output signal representative of light received from the single continuous path. The output signal from the single optical path is compared with the respective outputs of the individual panels to ascertain that there is anisotropic radiation from a source in the container which under predetermined threshold conditions, causes the provision of an alert output from the processor.

It will be appreciated that one or more light sources can be used in various combinations to introduce light into the respective optical fibers. One or more light detectors can also be used in various combinations to receive light from the respective optical fibers. If a single detector is shared by more than one optical fiber, some manner of discriminating the optical signals received from respective fibers must be provided, such as coded light signals propagated through respective fibers to provide distinguishing signals for detection and discrimination by the shared detector.

Figure 11:
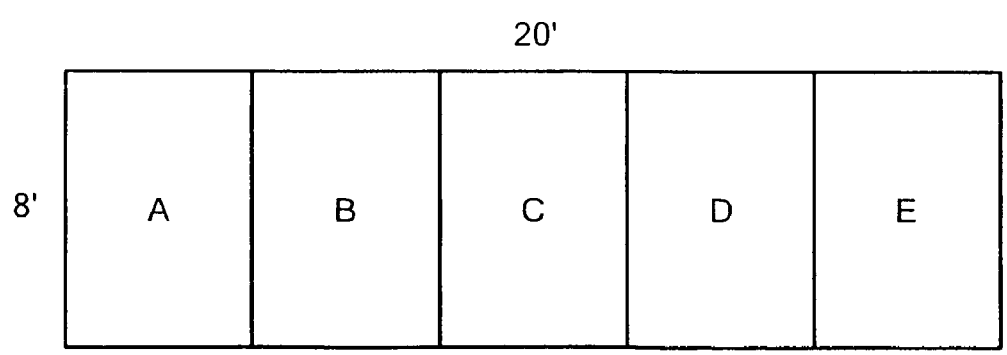
FIG. 11 is a diagrammatic illustration of a container lined with sheets of standard size.

The panel liners can be fabricated from standard size panels which for example could be 4×8' panels or sheets. A standard 20' shipping container can be lined by 24 4×8 panels, for example. As an illustration, FIG. 11 shows a 20' container side lined with five 4×8' sheets, each having an optical fiber path as described above. In the foregoing example of 24 4×8 panels employed to line a 20' container, each of the panels represents approximately 4% of the total area of the interior walls of the container. Each of the 4×8 panels can have its own optical fiber path and associated light source and detector. The detectors of all of the panels are connected to a processor which can include the above noted Fourier chip to process ratios of intensity of darkening as well as ratios of time based rate of darkening for each of the 24 panels in relation to each other or a combination thereof.

As discussed above, the optical fiber in the panel or liner which is opposite to the preferred direction of emission of a nuclear source in a container will darken more than in the optical fibers of the other panels. Therefore the signal strength from the detector associated with the most darkened optical fiber or greatest rate of change of darkening will be greater than the signal strength from the other detectors. If the optical fibers of all panels have the same output, it is not likely that a nuclear source is in the container since there is no preferred direction of emission which would be detectable. This still would be true even if a nuclear source was emitting isotropically and is located in the geometric center of a container which would have to be a sphere or of other uniform shape having a geometric center which would emit perfectly isotropic radiation in all directions. This is not a likely situation, as radiation from most sources of interest for detection have a preferred direction of emission and therefore are not isotropic. It is also not likely that the nuclear source would be in the geometric center of a container, either because the container is of rectangular or other shape which does not have a geometric center or because even if there was a geometric center, the source could not be reliably placed and maintained at such a center.

Hence, this embodiment of the invention allows for the detection of an anisotropic radiation source from within the container, since this solid angle source of emission will overlay and be in addition to any nominal uniform isotropic background radiation. Another aspect of this invention is that the sensitivity of the optical fiber for detection of radiation through the darkening (attenuation) process or rate of darkening process can be fixed at manufacturing by the use of specific dopants, known to those in the trade, to fix the radiation detection threshold to some level that would not cause significant darkening at 300 millirems of cumulative radiation per year, which is the average global level of background radiation from all sources including cosmic radiation. In this manner a secreted source of radioactive material can be made to leave a telltale individual signature that cannot be mistaken for the effects of darkening of the optical fiber sensor due to a generalized uniform and isotropic background source.

It will be appreciated that the present invention is not limited to protection of shipping containers although that is a major use for the invention. The invention is applicable as well to any volumetric enclosure as well as to other multi-sided containers or containers of other shapes including spherical or otherwise rounded containers, cylindrical containers, cylindrical pipes and ellipsoidal containers and pipes, such as used for petroleum, gas and chemical conveyance and the like. The optical fiber sensor can be contained within flat sheets, or in a flexible fabric or medium which can be shaped to accommodate containers or enclosures of many different volumetric or flat configurations, such as lining pathways, hallways, or perimeters of any geometrical configuration or size.

What is claimed is:

1. A radiation detection system comprising:
   a panel structure sized to line the interior walls of a multi-sided container;
   the panel structure having an annealing-resistant optical fiber therein and extending in an optical fiber path across substantially the entire area of the panel structure to envelop substantially the entire volume of the container;
   the annealing-resistant optical fiber having a first end and a second end;
   the annealing-resistant optical fiber being reactive to nuclear radiation impinging on the optical fiber to cause a change in light carrying capacity of the optical fiber;
   a light source optically coupled to one end of the optical fiber for introducing light;
   a light detector optically coupled to the other end of the optical fiber for receiving light from the optical fiber; and
   a circuit connected to the light detector and operative to detect the change in light carrying capacity of the optical fiber and to provide an indication thereof,
   wherein the optical fiber is capable of having at least one color center created therein in response to nuclear radiation impinging thereon, and
   wherein the at least one created color center is sensitive to a respective frequency of light from the light source.

2. The radiation detection system of claim 1 wherein:
   the light source is operative to introduce light in the optical fiber path of predetermined intensity and frequency; and
   the circuit connected to the light detector is operative to detect at least one of a decrease in intensity of the light from the optical fiber path and a change in the frequency of the light from the optical fiber path, and to provide an indication thereof.

3. The radiation detection system of claim 2 wherein the circuit connected to the light detector is operative to determine the rate of decrease in the intensity of light from the optical fiber path.

4. The radiation detection system of claim 3 wherein the circuit is operative to determine from the rate of decrease in the intensity of light, the signature of radiation causing the decrease.

5. The radiation detection system of claim 1 wherein the light source is a tunable laser light source.

6. The radiation detection system of claim 1 wherein the optical fiber includes at least one dopant to facilitate a response to the nuclear radiation.

7. The radiation detection system of claim 1 wherein the optical fiber has color centers sensitive to specific types of nuclear radiation.

8. The radiation detection system of claim 1 wherein the circuit is operative to detect a change in the rate of decrease in light carrying capacity of the optical fiber path.

9. The radiation detection system of claim 1 wherein the optical fiber includes a glass core and cladding material surrounding the glass core.

10. The radiation detection system of claim 1 wherein the optical fiber includes a glass core retained in the optical fiber path of a communal cladding material in the panel structure.

11. The radiation detection system of claim 1 wherein the panel structure includes a cladding material in which the optical fiber is disposed in the optical fiber path.

12. The radiation detection system of claim 1 wherein the panel structure includes a sheathing material enclosing the optical fiber disposed in the optical fiber path.

13. The radiation detection system of claim 12 wherein the sheathing material includes hard or abrasive particles or strands which if engaged by a tool bit breaching the panel structure will result in abrasion or breaking of the optical fiber.

14. The radiation detection system of claim 1 wherein the optical fiber is disposed in a communal cladding material about which is provided a sheathing material.

15. The radiation detection system of claim 1 wherein the panel structure has at least one radiation shielding sheet across a surface thereof to isolate radiation from extraneous sources.

16. The radiation detection system of claim 15 wherein the shielding sheet is disposed between the inside wall of the container and the panel structure to isolate the interior of the container from extraneous radiation sources outside of the container.

17. The radiation detection system of claim 15 wherein the at least one shielding sheet includes:
   a first shielding sheet disposed between the inside wall of the container and the panel structure, and a second shielding sheet disposed on the inner side of the panel structure facing the interior of the container;
   the first shielding sheet operative to block extraneous radiation outside of the container;
   the second shielding sheet operative to block gamma rays and to allow passage of neutrons to be detectable by the optical fiber.

18. The radiation detection system of claim 1 further comprising:
   a second annealing resistant optical fiber extending in an optical fiber path adjacent to the optical fiber path of the panel structure, the second optical fiber path extending across substantially the entire area of the panel structure to envelop substantially the entire volume of the container;
   a first shielding sheet disposed between the panel structure and the second optical fiber and operative to block gamma rays and to pass neutrons;

a second shielding sheet disposed between the second optical fiber and the container wall and operative to block gamma rays and to pass neutrons;

the second optical fiber operative to detect neutrons;

a second optical fiber optically coupled to a second light source at one end and to a second light detector at the other end;

the circuit being connected to the light detectors and to provide discrimination between neutron and other forms of radiation impinging on the optical fibers.

19. The radiation detection system of claim 1 wherein the circuit is operative to compare the ratio of gamma radiation and neutron radiation and the ratio of emission energy per unit of time with stored radiation signature profiles for the identification of radioactive source material.

20. The radiation detection system of claim 1 wherein:

the panel structure has a plurality of optical fiber paths;

the light source is optically coupled to one end of each of the optical fibers for introducing light;

the light detector includes a light detector optically coupled to the other end of each of the optical fibers for receiving light from the respective optical fibers;

the circuit is connected to all of the light detectors and operative to compare the decrease in light carrying capacity of the respective optical fiber paths.

21. The radiation detection system of claim 20 including:

a second annealing resistant optical fiber extending in an optical fiber path across substantially the entire area of the panel structure to envelop substantially the entire volume of the container and providing a single continuous optical fiber path;

the light source including a light source coupled to one end of the second optical fiber for introducing light;

the light detector including a light detector optically coupled to the other end of the second optical fiber for receiving light from the second optical fiber;

the circuit including a circuit connected to the light detector coupled to the second optical fiber and operative to detect the decrease in light carrying capacity of the second optical fiber and to provide an indication thereof.

22. The radiation detection system of claim 21 wherein the circuit includes a circuit for comparison of the decrease in light carrying capacity of the optical fibers and to provide an indication thereof.

23. The radiation detection system of claim 1 wherein the optical fiber is enclosed in a neutron moderating material to slow neutrons to thermal energies impinging on the optical fiber from a radiation source.

24. The radiation detection system of claim 23 wherein the optical fiber includes a glass core and cladding material surrounding the glass core.

25. The radiation detection system of claim 23 wherein the panel structure includes a sheathing material enclosing the optical fiber disposed in the optical fiber path, and the neutron moderating material is in the sheathing material of the optical fiber.

26. The radiation detection system of claim 23 wherein the panel structure includes a resin material which bonds the panel structure to the inside wall of the container, and the neutron moderating material is in the resin material.

27. The radiation detection system of claim 1 wherein the optical fiber is a single mode fiber.

28. The radiation detection system of claim 1 wherein the optical fiber is a multimode fiber.

29. The radiation detection system of claim 1 further including a memory storing one or more profiles of radiation data;

the circuit connected to the light detector including apparatus for comparing the profile of light received from the optical path with profiles stored in the memory and for providing an output indication identifying the specific radiation impinging on the optical fiber.

30. The radiation detection system of claim 29 wherein the memory comprises a memory unit for storing data from various radioactive sources according to the half-life decay formula $N=N_0 \exp(-\gamma t)$ which gives an identifying decay signature of the specific radioactive isotope.

31. The radiation detection system of claim 30 wherein the memory unit additionally stores data identifying the decay signature of any ensuing radioactive daughter isotopes created by the decay of the parent or original isotope.

32. The radiation detection system of claim 29 wherein the memory stores profiles of radiation data on predetermined isotopes; and the circuit is operative to compare the profiles of radiation data on predetermined isotopes and to provide an output indication identifying the specific isotope of the radiation impinging on the optical fiber.

33. The radiation detection system of claim 32 wherein the circuit is operative to compare the profiles of radiation data on tagged isotopes and to provide an output indication identifying the specific tagged isotope of the radiation impinging on the optical fiber.

34. The radiation detection system of claim 29 wherein the memory includes a Fourier chip to store color center data, and to perform a Fourier analysis on measured color center data for comparison to stored color center data.

35. The system of claim 1 wherein the optical fiber extends in a serpentine path across substantially the entire area of the panel.

36. The system of claim 35 wherein spacing between adjacent portions of the optical fiber is of a smaller size than a breach that could compromise the security of the container.

37. The system of claim 36 wherein spacing between adjacent portions of the optical fiber is sufficiently small to cause breakage or degradation of the optical fiber in reaction to an attempted breach of the panel.

38. The system of claim 1 wherein each of the plurality of liner panels is rectangular.

39. The radiation detection system of claim 1 wherein the light source provides light having a wavelength that enhances the sensitivity of the optical fiber to the radiation-induced change in the light in the optical fiber.

40. The radiation detection system of claim 1 wherein the light source provides light having a wavelength that is varied in accordance with the signature of the light received from the optical fiber path.

41. The radiation detection system of claim 1 wherein the light source provides light having a predetermined characteristic.

42. The radiation detection system of claim 41 wherein the predetermined characteristic of the light is one of sinusoidal, pulses, impulse waveforms and pulse trains.

43. The radiation detection system of claim 1 wherein the liner panels are integral with the container sides.

44. The radiation detection system of claim 1 wherein the optical fiber includes one or more dopants which enhance sensitivity of the optical fiber to the radiation induced change in the light in the optical fiber.

45. The radiation detection system of claim 44 wherein the dopant is selected from the group consisting of gadolinium, isotope enriched gadolinium 157, boron 10 and lithium.

46. The radiation detection system of claim 1 wherein the entire enclosed volumetric space of the container, and the surrounding volumetric mass of the optical fiber constitutes a radiation detection system which totally encapsulates radioactive material in the container.

47. The radiation detection system of claim 1 including a telecommunication interface operative to transmit a detection signal from the circuit that indicates an alarm condition to one or more monitoring stations.

48. The radiation detection system of claim 1 wherein the optical fiber path provides a solid angle of emission of radiation from the nuclear radiation source and experiences a time integration of the emitted radiation impinging on the optical fiber.

49. The radiation detection system of claim 1 wherein the panel structure includes:
   a plurality of liner panels each sized to line an interior wall of a respective side of the container, each of the liner panels having an annealing resistant optical fiber therein extending in a path across substantially the entire area of the panel, the optical fiber having a first end and a second end;
   the light source includes a light source optically coupled to one end of the optical fiber of each of the liner panels and the light detector includes a light detector optically coupled to the other end of the optical fiber of each of the liner panels;
   the circuit is operative to compare the intensity of the received light from all of the panels and provide an alert if at least one of the intensities of received light is different than the other intensities of received light.

50. The radiation detection system of claim 1 wherein the circuit is operative to detect a change in an optical characteristic of the light from the light source transmitted in the optical fiber path.

51. A radiation detection system comprising:
   a support sized and shaped to enclose substantially the entire volume of a protected space;
   the support having an annealing-resistant optical fiber therein and extending in an optical fiber path across substantially the entire area of the support to envelop substantially the entire volume of the protected space;
   the annealing-resistant optical fiber having a first end and a second end;
   the annealing-resistant optical fiber being reactive to nuclear radiation impinging on the optical fiber to cause a change in light carrying capacity of the optical fiber;
   a light source optically coupled to one end of the optical fiber for introducing light;
   a light detector optically coupled to the other end of the optical fiber for receiving light from the optical fiber; and
   a circuit connected to the light detector and operative to detect the change in light carrying capacity of the optical fiber and to provide an indication thereof,
   wherein:
      the optical fiber is reactive to nuclear radiation impinging on the optical fiber to cause a change in incremental slices of the optical fiber along the length thereof; and
      the circuit is operative to detect the integrated effect of changes in the incremental slices.

52. The radiation detection system of claim 51 wherein the circuit includes:
   fail-safe circuitry that provides a fail-safe alarm signal in the absence of a signal from the light detector, irrespective of the cause of the signal absence.

53. The radiation detection system of claim 51 wherein:
   the support includes a plurality of panels each having an annealing resistant optical fiber therein extending in a path across substantially the entire area of the panel, the optical fiber having a first end and a second end;
   the light source includes a light source optically coupled to one end of the optical fiber of each of the panels and the light detector includes a light detector optically coupled to the other end of the optical fiber of each of the panels; and
   the circuit is operative to compare the intensity of the received light from all of the panels and provide an alert if at least one of the intensities of received light is different than the other intensities of received light.

54. The radiation detection system of claim 51 wherein the circuit is operative to discriminate radiation from a radiation source in the protected space from background radiation from inside or outside the protected space.

55. The radiation detection system of claim 51 wherein the support has a plurality of optical fibers extending in a plurality of optical fiber paths across respective areas of the support; and
   the circuit is operative to distinguish anisotropic radiation from a source in the protected space from isotropic radiation from background sources.

56. The radiation detection system of claim 51 wherein the circuit is operative to count the integrated effect of darkened incremental slices of the optical fiber along the length thereof, and compute the total volumetric attenuation of the light transmission in the optical fiber path.

57. A radiation detection system comprising:
   a panel structure sized to line the interior walls of a multi-sided container;
   the panel structure having an annealing-resistant optical fiber therein and extending in an optical fiber path across substantially the entire area of the panel structure to envelop substantially the entire volume of the container;
   the annealing-resistant optical fiber having a first end and a second end;
   the annealing-resistant optical fiber being reactive to nuclear radiation impinging on the optical fiber to cause a change in light carrying capacity of the optical fiber;
   a light source optically coupled to one end of the optical fiber for introducing light;
   a light detector optically coupled to the other end of the optical fiber for receiving light from the optical fiber; and
   a circuit connected to the light detector and operative to detect the change in light carrying capacity of the optical fiber and to provide an indication thereof,
   wherein the panel structure comprises a sheathing material enclosing the optical fiber disposed in the optical fiber path, said sheathing material comprising hard or abrasive particles or strands which if engaged by a tool bit breaching the panel structure will result in abrasion or breaking of the optical fiber.

58. The radiation detection system of claim 57 wherein:
   the optical fiber is capable of having at least one color center created therein in response to the nuclear radiation, and
   wherein the optical fiber has color centers sensitive to respective frequencies of light from the light source.

59. The radiation detection system of claim 57 further comprising:
   a second annealing resistant optical fiber extending in an optical fiber path adjacent to the optical fiber path of the panel structure, the second optical fiber path extending across substantially the entire area of the panel structure to envelop substantially the entire volume of the container;

a first shielding sheet disposed between the panel structure and the second optical fiber and operative to block gamma rays and to pass neutrons;

a second shielding sheet disposed between the second optical fiber and the container wall and operative to block gamma rays and to pass neutrons;

the second optical fiber operative to detect neutrons;

a second optical fiber optically coupled to a second light source at one end and to a second light detector at the other end;

the circuit being connected to the light detectors and to provide discrimination between neutron and other forms of radiation impinging on the optical fibers.

60. The radiation detection system of claim 57 wherein the circuit is operative to compare the ratio of gamma radiation and neutron radiation and the ratio of emission energy per unit of time with stored radiation signature profiles for the identification of radioactive source material.

61. The radiation detection system of claim 57 further including:

a memory storing one or more profiles of radiation data; and the circuit connected to the light detector including apparatus for comparing the profile of light received from the optical path with profiles stored in the memory and for providing an output indication identifying the specific radiation impinging on the optical fiber, wherein the memory comprises a memory unit for storing data from various radioactive sources according to the half-life decay formula $N=N_o\exp(-\gamma t)$ which gives an identifying decay signature of the specific radioactive isotope.

62. The radiation detection system of claim 57 further including:

a memory storing one or more profiles of radiation data; and the circuit connected to the light detector including apparatus for comparing the profile of light received from the optical path with profiles stored in the memory and for providing an output indication, wherein the memory includes a Fourier chip to store color center data, and to perform a Fourier analysis on measured color center data for comparison to stored color center data.

63. The radiation detection system of claim 57 wherein the optical fiber is enclosed in a neutron moderating material to slow neutrons to thermal energies impinging on the optical fiber from a radiation source.

64. A radiation detection system comprising:

a panel structure sized to line the interior walls of a multi-sided container;

the panel structure having an annealing-resistant optical fiber therein and extending in an optical fiber path across substantially the entire area of the panel structure to envelop substantially the entire volume of the container;

the annealing-resistant optical fiber having a first end and a second end;

the annealing-resistant optical fiber being reactive to nuclear radiation impinging on the optical fiber to cause a change in light carrying capacity of the optical fiber;

a light source optically coupled to one end of the optical fiber for introducing light;

a light detector optically coupled to the other end of the optical fiber for receiving light from the optical fiber; and a circuit connected to the light detector and operative to detect the change in light carrying capacity of the optical fiber and to provide an indication thereof, wherein the panel structure has at least one radiation shielding sheet across a surface thereof to isolate radiation from extraneous sources.

65. The radiation detection system of claim 64 wherein:

the light source is operative to introduce light in the optical fiber path of predetermined intensity and frequency; and the circuit connected to the light detector is operative to detect at least one of a decrease in intensity of the light from the optical fiber path and a change in the frequency of the light from the optical fiber path, and to provide an indication thereof, wherein the circuit connected to the light detector is operative to determine the rate of decrease in the intensity of light from the optical fiber path.

66. The radiation detection system of claim 64 wherein:

the optical fiber is capable of having at least one color center created therein in response to nuclear radiation impinging thereon, and wherein the at least one created color center is sensitive to a respective frequency of light from the light source.

67. The radiation detection system of claim 66 wherein the optical fiber has color centers sensitive to specific types of nuclear radiation.

68. The radiation detection system of claim 64 further comprising:

a second annealing resistant optical fiber extending in an optical fiber path adjacent to the optical fiber path of the panel structure, the second optical fiber path extending across substantially the entire area of the panel structure to envelop substantially the entire volume of the container;

a first shielding sheet disposed between the panel structure and the second optical fiber and operative to block gamma rays and to pass neutrons;

a second shielding sheet disposed between the second optical fiber and the container wall and operative to block gamma rays and to pass neutrons;

the second optical fiber operative to detect neutrons;

a second optical fiber optically coupled to a second light source at one end and to a second light detector at the other end;

the circuit being connected to the light detectors and to provide discrimination between neutron and other forms of radiation impinging on the optical fibers.

69. The radiation detection system of claim 64 wherein the circuit is operative to compare the ratio of gamma radiation and neutron radiation and the ratio of emission energy per unit of time with stored radiation signature profiles for the identification of radioactive source material.

70. The radiation detection system of claim 64 wherein the optical fiber is enclosed in a neutron moderating material to slow neutrons to thermal energies impinging on the optical fiber from a radiation source from within the container.

71. The radiation detection system of claim 64 wherein the light source provides light having a wavelength that enhances the sensitivity of the optical fiber to the radiation-induced change in the light in the optical fiber.

72. The radiation detection system of claim 64 wherein the light source provides light having a wavelength that is varied in accordance with the signature of the light received from the optical fiber path.

73. A radiation detection system comprising:
a panel structure sized to line the interior walls of a multi-sided container;
the panel structure having a first annealing-resistant optical fiber therein and extending in a first optical fiber path across substantially the entire area of the panel structure to envelop substantially the entire volume of the container;
the first annealing-resistant optical fiber having a first end and a second end;
the first annealing-resistant optical fiber being reactive to nuclear radiation impinging on the first optical fiber to cause a change in light carrying capacity of the first optical fiber;
a second annealing resistant optical fiber extending in a second optical fiber path adjacent to the first optical fiber path of the panel structure, the second optical fiber path extending across substantially the entire area of the panel structure to envelop substantially the entire volume of the container;
the second optical fiber operative to detect neutrons;
a first light source optically coupled to one end of the first optical fiber for introducing light;
a first light detector optically coupled to the other end of the first optical fiber for receiving light from the first optical fiber;
a second light source optically coupled to one end of the second optical fiber for introducing light;
a second light detector optically coupled to the other end of the second optical fiber for receiving light from the second optical fiber;
a first shielding sheet disposed between the panel structure and the second optical fiber and operative to block gamma rays and to pass neutrons;
a second shielding sheet disposed between the second optical fiber and the container wall and operative to block gamma rays and to pass neutrons; and
a circuit connected to the first and second light detectors and operative to detect a change in light carrying capacity of the first and second optical fibers and to provide an indication thereof and to provide discrimination between neutron and other forms of radiation impinging on the first and second optical fibers.

74. The radiation detection system of claim 73 wherein:
the light source is operative to introduce light in the optical fiber path of predetermined intensity and frequency; and
the circuit connected to the light detector is operative to detect at least one of a decrease in intensity of the light from the optical fiber path and a change in the frequency of the light from the optical fiber path, and to provide an indication thereof,
wherein the circuit connected to the light detector is operative to determine the rate of decrease in the intensity of light from the optical fiber path.

75. The radiation detection system of claim 74 wherein the circuit is operative to determine from the rate of decrease in the intensity of light, the signature of radiation causing the decrease.

76. The radiation detection system of claim 73 wherein:
the optical fiber is capable of having at least one color center created therein in response to the nuclear radiation, and
wherein the optical fiber has color centers sensitive to respective frequencies of light from the light source.

77. The radiation detection system of claim 76 wherein the optical fiber has color centers sensitive to specific types of nuclear radiation.

78. The radiation detection system of claim 73 wherein the circuit is operative to compare the ratio of gamma radiation and neutron radiation and the ratio of emission energy per unit of time with stored radiation signature profiles for the identification of radioactive source material.

79. The radiation detection system of claim 73 wherein the optical fiber is enclosed in a neutron moderating material to slow neutrons to thermal energies impinging on the optical fiber from a radiation source.

80. The radiation detection system of claim 73 wherein the light source provides light having a wavelength that enhances the sensitivity of the optical fiber to the radiation-induced change in the light in the optical fiber.

81. The radiation detection system of claim 73 wherein the circuit is operative to detect a change in an optical characteristic of the light from the light source transmitted in the optical fiber path.

82. A radiation detection system comprising:
a panel structure sized to line the interior walls of a multi-sided container;
the panel structure having an annealing-resistant optical fiber therein and extending in an optical fiber path across substantially the entire area of the panel structure to envelop substantially the entire volume of the container;
the annealing-resistant optical fiber having a first end and a second end;
the annealing-resistant optical fiber being reactive to nuclear radiation impinging on the optical fiber to cause a change in light carrying capacity of the optical fiber;
a light source optically coupled to one end of the optical fiber for introducing light;
a light detector optically coupled to the other end of the optical fiber for receiving light from the optical fiber; and
a circuit connected to the light detector and operative to detect the change in light carrying capacity of the optical fiber and to provide an indication thereof,
wherein the circuit is operative to compare a ratio of gamma radiation and neutron radiation and a ratio of emission energy per unit of time with stored radiation signature profiles for the identification of radioactive source material.

83. The radiation detection system of claim 82 wherein:
the light source is operative to introduce light in the optical fiber path of predetermined intensity and frequency; and
the circuit connected to the light detector is operative to detect at least one of a decrease in intensity of the light from the optical fiber path and a change in the frequency of the light from the optical fiber path, and to provide an indication thereof,
wherein the circuit connected to the light detector is operative to determine the rate of decrease in the intensity of light from the optical fiber path.

84. The radiation detection system of claim 83 wherein the circuit is operative to determine from the rate of decrease in the intensity of light, the signature of radiation causing the decrease.

85. The radiation detection system of claim 82 wherein:
the optical fiber is capable of having at least one color center created therein in response to the nuclear radiation, and
wherein the optical fiber has color centers sensitive to respective frequencies of light from the light source.

86. The radiation detection system of claim 85 wherein the optical fiber has color centers sensitive to specific types of nuclear radiation.

87. The radiation detection system of claim 82 wherein the optical fiber is enclosed in a neutron moderating material to slow neutrons to thermal energies impinging on the optical fiber from a radiation source.

88. A radiation detection system comprising:
a panel structure sized to line the interior walls of a multi-sided container;
the panel structure having an annealing-resistant optical fiber therein and extending in an optical fiber path across substantially the entire area of the panel structure to envelop substantially the entire volume of the container;
the annealing-resistant optical fiber having a first end and a second end;
the annealing-resistant optical fiber being reactive to nuclear radiation impinging on the optical fiber to cause a change in light carrying capacity of the optical fiber;
a light source optically coupled to one end of the optical fiber for introducing light;
a light detector optically coupled to the other end of the optical fiber for receiving light from the optical fiber;
a memory storing one or more profiles of radiation data, the memory comprising a memory unit for storing data from various radioactive sources according to the half-life decay formula $N=N_o \exp(-\gamma t)$ which gives an identifying decay signature of the specific radioactive isotope; and
a circuit connected to the light detector and operative to detect the change in light carrying capacity of the optical fiber and to provide an indication thereof,
wherein the circuit connected to the light detector further comprises an apparatus for comparing the profile of light received from the optical path with the one or more profiles stored in the memory and for providing an output indication identifying the specific radiation impinging on the optical fiber.

89. The radiation detection system of claim 88 wherein:
the light source is operative to introduce light in the optical fiber path of predetermined intensity and frequency; and
the circuit connected to the light detector is operative to detect at least one of a decrease in intensity of the light from the optical fiber path and a change in the frequency of the light from the optical fiber path, and to provide an indication thereof,
wherein the circuit connected to the light detector is operative to determine the rate of decrease in the intensity of light from the optical fiber path.

90. The radiation detection system of claim 89 wherein the circuit is operative to determine from the rate of decrease in the intensity of light, the signature of radiation causing the decrease.

91. The radiation detection system of claim 88 wherein:
the optical fiber is capable of having at least one color center created therein in response to the nuclear radiation, and
wherein the optical fiber has color centers sensitive to respective frequencies of light from the light source.

92. The radiation detection system of claim 91 wherein the optical fiber has color centers sensitive to specific types of nuclear radiation.

93. The radiation detection system of claim 88 further comprising:
a second annealing resistant optical fiber extending in an optical fiber path adjacent to the optical fiber path of the panel structure, the second optical fiber path extending across substantially the entire area of the panel structure to envelop substantially the entire volume of the container;
a first shielding sheet disposed between the panel structure and the second optical fiber and operative to block gamma rays and to pass neutrons;
a second shielding sheet disposed between the second optical fiber and the container wall and operative to block gamma rays and to pass neutrons;
the second optical fiber operative to detect neutrons;
a second optical fiber optically coupled to a second light source at one end and to a second light detector at the other end;
the circuit being connected to the light detectors and to provide discrimination between neutron and other forms of radiation impinging on the optical fibers.

94. The radiation detection system of claim 88 wherein the circuit is operative to compare the ratio of gamma radiation and neutron radiation and the ratio of emission energy per unit of time with stored radiation signature profiles for the identification of radioactive source material.

95. The radiation detection system of claim 88 wherein the optical fiber is enclosed in a neutron moderating material to slow neutrons to thermal energies impinging on the optical fiber from a radiation source.

96. A radiation detection system comprising:
a panel structure sized to line the interior walls of a multi-sided container;
the panel structure having an annealing-resistant optical fiber therein and extending in an optical fiber path across substantially the entire area of the panel structure to envelop substantially the entire volume of the container;
the annealing-resistant optical fiber having a first end and a second end;
the annealing-resistant optical fiber being reactive to nuclear radiation impinging on the optical fiber to cause a change in light carrying capacity of the optical fiber;
a light source optically coupled to one end of the optical fiber for introducing light;
a light detector optically coupled to the other end of the optical fiber for receiving light from the optical fiber;
a memory storing one or more profiles of radiation data, wherein the memory includes a Fourier chip to store color center data, and to perform a Fourier analysis on measured color center data for comparison to stored color center data; and
a circuit connected to the light detector and operative to detect the change in light carrying capacity of the optical fiber and to provide an indication thereof,
wherein the circuit connected to the light detector further comprises an apparatus for comparing the profile of light received from the optical path with the one or more profiles stored in the memory and for providing an output indication identifying the specific radiation impinging on the optical fiber.

97. The radiation detection system of claim 96 wherein:
the light source is operative to introduce light in the optical fiber path of predetermined intensity and frequency; and
the circuit connected to the light detector is operative to detect at least one of a decrease in intensity of the light from the optical fiber path and a change in the frequency of the light from the optical fiber path, and to provide an indication thereof,
wherein the circuit connected to the light detector is operative to determine the rate of decrease in the intensity of light from the optical fiber path.

98. The radiation detection system of claim 97 wherein the circuit is operative to determine from the rate of decrease in the intensity of light, the signature of radiation causing the decrease.

99. The radiation detection system of claim 96 wherein:
the optical fiber is capable of having at least one color center created therein in response to the nuclear radiation, and.
wherein the optical fiber has color centers sensitive to respective frequencies of light from the light source.

100. The radiation detection system of claim 99 wherein the optical fiber has color centers sensitive to specific types of nuclear radiation.

101. The radiation detection system of claim 96 further comprising:
a second annealing resistant optical fiber extending in an optical fiber path adjacent to the optical fiber path of the panel structure, the second optical fiber path extending across substantially the entire area of the panel structure to envelop substantially the entire volume of the container;
a first shielding sheet disposed between the panel structure and the second optical fiber and operative to block gamma rays and to pass neutrons;
a second shielding sheet disposed between the second optical fiber and the container wall and operative to block gamma rays and to pass neutrons;
the second optical fiber operative to detect neutrons;
a second optical fiber optically coupled to a second light source at one end and to a second light detector at the other end;
the circuit being connected to the light detectors and to provide discrimination between neutron and other forms of radiation impinging on the optical fibers.

102. The radiation detection system of claim 96 wherein the circuit is operative to compare the ratio of gamma radiation and neutron radiation and the ratio of emission energy per unit of time with stored radiation signature profiles for the identification of radioactive source material.

103. The radiation detection system of claim 96 wherein the optical fiber is enclosed in a neutron moderating material to slow neutrons to thermal energies impinging on the optical fiber from a radiation source.

104. A radiation detection system comprising:
a panel structure sized to line the interior walls of a multi-sided container;
the panel structure having an annealing-resistant optical fiber therein and extending in an optical fiber path across substantially the entire area of the panel structure to envelop substantially the entire volume of the container;
the panel structure including a resin material which bonds the panel structure to the inside wall of the container, wherein the optical fiber is enclosed in the resin material;
the annealing-resistant optical fiber having a first end and a second end;
the annealing-resistant optical fiber being reactive to nuclear radiation impinging on the optical fiber to cause a change in light carrying capacity of the optical fiber;
a light source optically coupled to one end of the optical fiber for introducing light;
a light detector optically coupled to the other end of the optical fiber for receiving light from the optical fiber; and
a circuit connected to the light detector and operative to detect the change in light carrying capacity of the optical fiber and to provide an indication thereof,
wherein the resin material comprises a neutron moderating material to slow neutrons to thermal energies impinging on the optical fiber from a radiation source.

105. The radiation detection system of claim 104 wherein:
the light source is operative to introduce light in the optical fiber path of predetermined intensity and frequency; and
the circuit connected to the light detector is operative to detect at least one of a decrease in intensity of the light from the optical fiber path and a change in the frequency of the light from the optical fiber path, and to provide an indication thereof,
wherein the circuit connected to the light detector is operative to determine the rate of decrease in the intensity of light from the optical fiber path and is operative to determine from the rate of decrease in the intensity of light, the signature of radiation causing the decrease.

106. The radiation detection system of claim 104 wherein:
the optical fiber is capable of having at least one color center created therein in response to the nuclear radiation, and
wherein the optical fiber has color centers sensitive to respective frequencies of light from the light source.

107. The radiation detection system of claim 106 wherein the optical fiber has color centers sensitive to specific types of nuclear radiation.

108. The radiation detection system of claim 104 further comprising:
a second annealing resistant optical fiber extending in an optical fiber path adjacent to the optical fiber path of the panel structure, the second optical fiber path extending across substantially the entire area of the panel structure to envelop substantially the entire volume of the container;
a first shielding sheet disposed between the panel structure and the second optical fiber and operative to block gamma rays and to pass neutrons;
a second shielding sheet disposed between the second optical fiber and the container wall and operative to block gamma rays and to pass neutrons;
the second optical fiber operative to detect neutrons;
a second optical fiber optically coupled to a second light source at one end and to a second light detector at the other end;
the circuit being connected to the light detectors and to provide discrimination between neutron and other forms of radiation impinging on the optical fibers.

109. The radiation detection system of claim 104 wherein the circuit is operative to compare the ratio of gamma radiation and neutron radiation and the ratio of emission energy per unit of time with stored radiation signature profiles for the identification of radioactive source material.

110. The radiation detection system of claim 104 wherein the light source provides light having a wavelength that enhances the sensitivity of the optical fiber to the radiation-induced change in the light in the optical fiber.

* * * * *